US012370957B2

(12) United States Patent
Edgarian et al.

(10) Patent No.: US 12,370,957 B2
(45) Date of Patent: Jul. 29, 2025

(54) MULTIFUNCTIONAL PLASTIC SNAPING MOUNTING SYSTEM

(71) Applicant: Aptiv Technologies AG, Schaffhausen (CH)

(72) Inventors: Robik Edgarian, Wuppertal (DE); Gian Marco Abbruzzese, Solingen (DE)

(73) Assignee: Aptiv Technologies AG, Schaffhausen (CH)

( * ) Notice: Subject to any disclaimer, the term of this patent is extended or adjusted under 35 U.S.C. 154(b) by 137 days.

(21) Appl. No.: 18/177,536

(22) Filed: Mar. 2, 2023

(65) Prior Publication Data

US 2023/0322164 A1    Oct. 12, 2023

(30) Foreign Application Priority Data

Apr. 4, 2022  (EP) ..................................... 22166518

(51) Int. Cl.
*B60R 11/00*  (2006.01)
*F16B 21/08*  (2006.01)

(52) U.S. Cl.
CPC ............ *B60R 11/00* (2013.01); *F16B 21/086* (2013.01); *B60R 2011/0003* (2013.01); *B60R 2011/0049* (2013.01); *B60R 2011/0085* (2013.01)

(58) Field of Classification Search
CPC ............ B60R 11/00; B60R 2011/0003; B60R 2011/0049; B60R 2011/0085; F16B 21/086; F16M 11/00; F16M 11/046; F16M 11/08
See application file for complete search history.

(56) References Cited

U.S. PATENT DOCUMENTS 2,788,047 A  *  4/1957  Rapata ................... F16B 37/041
                                                              411/182
2,956,605 A  *  10/1960  Rapata ................... F16B 37/041
                                                              411/531
(Continued)

FOREIGN PATENT DOCUMENTS

EP         3922866        12/2021
JP         H094616         1/1997
(Continued)

OTHER PUBLICATIONS

"Extended European Search Report", EP Application No. 22166518.5, Oct. 7, 2022, 7 pages.

*Primary Examiner* — Nkeisha Smith
(74) *Attorney, Agent, or Firm* — Harness, Dickey & Pierce, P.L.C.

(57) ABSTRACT

In aspects, a disclosed mounting system includes a device support plate, a base mounting plate, and at least one fastening element. The base mounting plate includes at least one bracket for coupling to the device support plate. The fastening element for securing the device support plate to the base mounting plate. The device support plate includes at least one connector defined by a wall arranged about a central longitudinal axis. The wall includes a plurality of resilient wall portions. An internal peripheral surface of the wall includes a channel defining a receiver for receiving the fastening element. The fastening element including at least two engagement members that include an external peripheral surface defining a mating surface for contacting a corresponding mating surface of the receiver.

20 Claims, 18 Drawing Sheets

(56) References Cited

U.S. PATENT DOCUMENTS

| | | | | |
|---|---|---|---|---|
| 4,480,809 A * | 11/1984 | Healey | F16M 11/10 | 248/185.1 |
| 4,797,916 A * | 1/1989 | Kojima | F16M 11/10 | 379/426 |
| 5,109,411 A * | 4/1992 | O'Connell | F16M 11/2021 | 379/454 |
| 5,320,311 A * | 6/1994 | Jensen | F16M 11/10 | 248/292.12 |
| 5,387,065 A * | 2/1995 | Sullivan | F16B 19/1081 | 411/48 |
| 5,857,728 A * | 1/1999 | Crotty, III | B60J 3/0221 | 296/97.9 |
| 6,048,147 A * | 4/2000 | Arisaka | F16B 19/1081 | 411/902 |
| 6,454,503 B1 * | 9/2002 | Polic | F16B 19/1081 | 24/324 |
| 7,677,850 B2 * | 3/2010 | Sano | F16B 41/002 | 411/45 |
| 9,011,058 B2 * | 4/2015 | Busch | F16B 21/086 | 411/41 |
| 9,622,362 B2 * | 4/2017 | Burrell | F16M 11/00 | |
| 11,745,645 B2 * | 9/2023 | Sickler | B60Q 1/24 | 396/419 |
| 11,821,572 B2 * | 11/2023 | Marchetti | F16M 11/046 | |
| 12,006,966 B2 * | 6/2024 | Dickinson | F16B 21/086 | |
| 2002/0056528 A1 | 5/2002 | Whitley | | |
| 2004/0091332 A1 * | 5/2004 | Kuntze | F16B 5/065 | 411/107 |
| 2013/0027852 A1 | 1/2013 | Wang et al. | | |
| 2014/0352940 A1 | 12/2014 | Whitney et al. | | |
| 2015/0308538 A1 | 10/2015 | Morris et al. | | |
| 2024/0067102 A1 * | 2/2024 | Iverson | B60R 11/0241 | |
| 2024/0367591 A1 * | 11/2024 | Wesch | B60R 11/00 | |

FOREIGN PATENT DOCUMENTS

| | | |
|---|---|---|
| JP | 4187187 | 11/2008 |
| JP | 2010261543 | 11/2010 |

\* cited by examiner

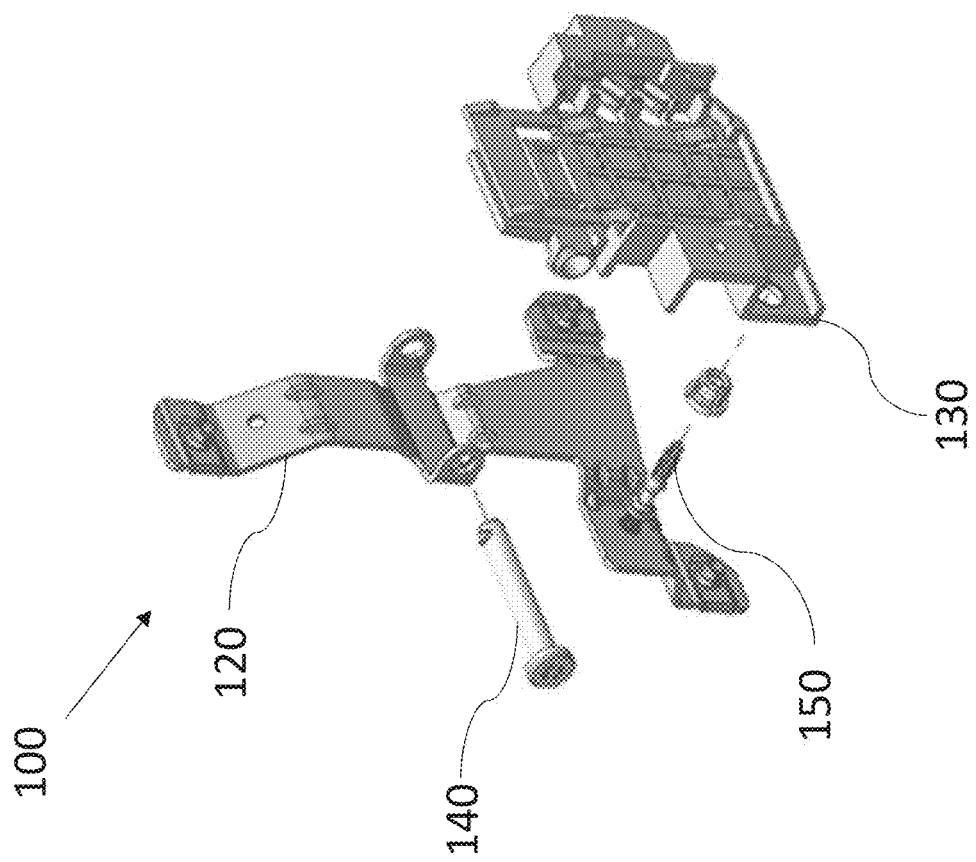

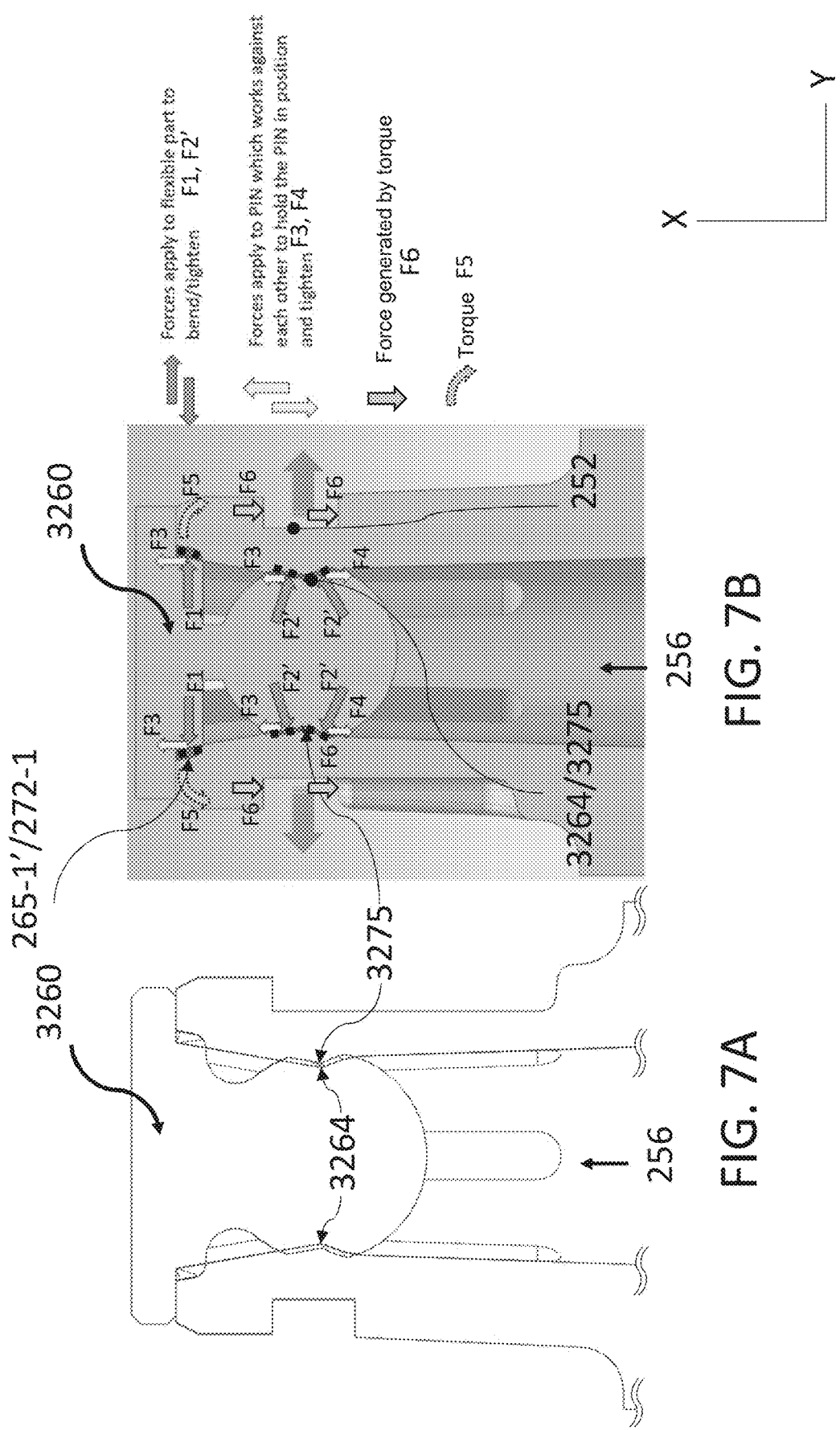

MULTIFUNCTIONAL PLASTIC SNAPING MOUNTING SYSTEM

INCORPORATION BY REFERENCE

This application claims priority to European Patent Application No. EP22166518.5, filed Apr. 4, 2022, the disclosure of which is incorporated by reference in its entirety.

FIELD

The present application relates in general to providing a rigid fixation of two parts and a mounting system for mounting an electronic device or an electronic module to a vehicle having such a fixation.

BACKGROUND

In modern vehicle architecture, there is often a need to provide a mounting or support for mounting an electronic device or an electronic module. To mount the electronic device to the vehicle, a bracket is provided to hold it in proper position. Some electronic devices or electronic module have their own housing and mounting features. To be able to integrate such devices to the vehicle, some current arrangements require two-piece brackets. Mostly one plastic bracket, which holds the device, and one metal bracket, which will be fixed to the vehicle. The two brackets may be interfaced by means of an alignment screw and additional fixing points. The interface between the plastic bracket which holds electronic device and the metal bracket screwed to the vehicle may use a steel pin. There are some disadvantages to the arrangement including cost disadvantages, expense and the arrangement is often over engineered. The arrangement using the steel pin also emits noise due to vibrations due to the design. Therefore, there is a need to provide an alternative interface arrangement that overcomes the above drawbacks of the current arrangements for mounting an electronic device or electronic module, to a vehicle.

SUMMARY

The present disclosure describes aspects of mounting systems including those described in accordance with the claims. Accordingly, a system as defined in independent claim 1 are provided. Further optional features are provided in accordance with the dependent claims.

According to the specification there is provided a mounting system configured to mount an electronic device or electronic module to a vehicle, the mounting system comprising: a base mounting plate; a device support plate for supporting the electronic device; and at least one fastening element for securing the device support plate to the base mounting plate; the base mounting plate comprising at least one bracket for coupling to the device support plate; the device support plate comprising at least one connector, each connector defined by a wall arranged about a central longitudinal axis (X), the wall of the connector comprises a plurality of resilient wall portions, an internal peripheral surface of the wall comprising a channel extending axially therethrough defining a receiver for receiving a fastening element; each fastening element comprising at least two engagement members, each comprising an external peripheral surface defining a mating surface for contacting a corresponding mating surface of the receiver; wherein each engagement member is configured to apply a respective controlling force to a corresponding mating surface of the receiver, which controlling force causes the plurality of the resilient wall portions of the receiver to be displaced, such that the wall of the connector engages with a corresponding bracket of the base mounting plate, so as to fasten the base mounting plate to the device support plate.

The mounting systems according to arrangements of the specification provide for a secure and robust attachment between the mounting plate and the device support plate and for mounting an electronic device or electronic module to a vehicle. The arrangements of the specification address problems with previous approaches. The fastening element and receiver of the connector are formed to conform and to provide controlled forces therebetween based on their interaction. The connector is flexible. As portions of the connector wall are displaced by application of force by the fastening element, they flex and are engaged more tightly with a corresponding coupling portion of the base mounting plate. The interactions are effective in securing the coupling are provided at multiple regions. The application of controlled forces including in the axial, radial directions provide flexing and bending and torque and forces arising from torque which provide tightening and robustness.

According to one aspect, the base mounting plate comprises at least one bracket for coupling to the device support plate; and a corresponding connector of the device support plate comprises a bracket connector member for coupling to the first base mounting plate at the bracket.

The connector of the device support plate comprises a bracket connector member formed recessed in the external peripheral surface of the wall of the connector, and the receiver formed extending through the internal peripheral surface of the wall. The connector is therefore the common component to the coupling of firstly the connector and bracket and secondly of the connector and fastening element. This provides a compact common coupling and supports interaction between all three components at each coupled joint.

According to another aspect the bracket connector member comprises a circumferential channel formed recessed relative to an external peripheral surface of the wall of the connector; and wherein the bracket and the bracket connector member are formed and dimensioned such that a portion of the bracket is receivable in the circumferential channel when the connector in snap-fitted into the bracket.

The bracket and connector are configured for coupling in two-steps. In an initial step, the bracket and connector are coupled by snap-fitting. The base mounting plate is relatively rigid and the connector of the device support plate is configured to allow flexing. The interface between two plates is defined by the bracket, connector, and fastening element. When the fastening element is pushed into the flexible connector, the wall of the connector effectively spreads or expands in response and the flexible connector is moved against the more rigid bracket at the bracket connector member and channel.

In one arrangement the connector and bracket are configured for coupling in a direction orthogonal (Z) to the central longitudinal axis (X) of the connector, and the fastening element and connector are configured for coupling in the direction of the central longitudinal axis, and wherein when engaged the fastening element and connector, and the bracket and bracket connector member are arranged concentrically around the central longitudinal axis of the connector.

The mounting system is based on a three-way interaction of the concentrically coupled components, which are configured to provide, by their interaction, controlled forces which act therebetween to secure the mounting by interlocking the connecting features. The controlled forces are provided by the direct interaction of the fastening element and receiver of the connector and a resultant flexing and bending of the connector wall in directions generally radially outwardly to tighten and secure the bracket connector member in the bracket. The tightening provides for an interlocking of the bracket located in the bracket connection member. The engagement between the fastening element and receiver is circumferential as is the engagement between the bracket and connector. By virtue of the circumferential coupling, movement of the plates about the axis of connector or coupled joint, is still possible to adjust the vertical angle alignment of the electronic device.

According to arrangement of the specification, the plurality of resilient wall portions are spaced apart by slots, the wall portions and slots extending in the longitudinal direction.

The wall of the connector is configured to be flexible or resilient by virtue of the configuration of the portions of the wall. The resilience may also result from the properties of the material of the wall. Therefore, the connection between the plates also has resilience. The fastening element is configured also as an expansion element, and the external peripheral surfaces of the engagement members are configured to bear in close contact with corresponding countersurfaces of the receiver, which are displaced or flex as a result.

In one arrangement the wall portion of the connector is displaced outwardly relative to central longitudinal axis of the receiver.

The connector is configured to have some flexibility. The forces arising from the interaction of the fastening element and receiver provides for a flexing and bending of the connector wall. The forces include forces directed generally outwardly relative to the central axis of the coupling. These forces which include forces near the proximal end of the receiver also provide for a bending of the connector and torque.

According to another arrangement each fastening element and corresponding receiver comprises conforming mating features for controlling forces therebetween when engaged, the forces resulting from the interaction of the fastening element and the receiver including forces F3, F4 in opposing axial directions (X) which act to maintain the fastening element in the receiver.

The fastening element and receiver of the connector are formed to conform and provide controlled forces based on their interaction, including forces in the axial direction. The opposing forces in the axial direction arising from the interaction of the fastening element at predefined locations act to retain the fastening element in the receiver and to resist pull-out.

In another arrangement, the forces resulting from the interaction of the fastening element and the receiver include forces which are provided in directions generally radial to the central axis, and which act to provide displacement of the connector wall outwardly with respect to the central longitudinal axis, and to thereby provide an interlocking of the base mounting plate at the device support plate, at the connector and the bracket. The arrangement is such that there is flexing, bending, and tightening of the coupling of the bracket and channel.

The controlled forces are provided by the direct interaction of the fastening element and receiver of the connector and a resultant flexing of the connector wall in directions radially outwardly to tighten and secure the bracket connector member in the bracket. The forces are provided further directed outwardly circumferentially.

In one arrangement, the fastening element comprises an elongated body that extends from a head portion at a proximal end to a tip at a distal end, and a first engagement member having a body of generally spherical or ovoid form, and wherein the mating surface thereof is configured to be engaged in a retainer of the receiver, and a second engagement member having a body of generally cylindrical form, wherein the first and second engagement members are in use circumferentially engaged with the receiver at axially spaced apart locations.

The fastening elements of the embodiments of the specification and the corresponding receivers are formed to conform and each arranged to engage at the peripheral surfaces circumferentially. Portions of the fastening element have a radial extent conforming with that of the receiver. The mating surfaces are configured to be clamped in contact when in the engaged position. The specification provides fastening elements having a portion of spherical, or ovoid form and other portions of cylindrical or tapered cylindrical form. The mating surfaces defined by the external peripheral surfaces of the first and second engagement members, may be arranged inclined relative to the central longitudinal axis of the fastening element. The corresponding portions of the internal peripheral surfaces of the receiver are inclined for conformity.

In another arrangement the receiver comprises a guide portion and a retainer each configured to engage corresponding engagement portions of the fastening element, wherein the guide portion comprises a tapered guide portion that extends between the opening and the retainer.

In a further arrangement the retainer comprises: a circumferential ridge which projects into the receiver relative to the internal peripheral wall, and a recess provided adjacent to the ridge, wherein the form of the retainer conforms with a corresponding engagement member of the fastening element. The receiver may comprise a retainer such as a recess for retaining the fastening element. The form of the recess depends on the forms of the corresponding engagement member of the fastener.

In one arrangement the fastening element and connector are configured such that the forces between said features include radial forces (F1 and F2) resulting from the interaction of the engagement portions of the fastening element and corresponding portions of the internal peripheral wall of the receiver are applied to the connector wall at axial locations either side of the channel to thereby provide for a tightening of the connections between the bracket and the channel.

In another arrangement, the bracket connector member and channel are located adjacent to and externally of the retainer of the receiver, the bracket connector member and channel formed in the external peripheral surface of the connector, and the retainer formed in the internal peripheral surface.

In one arrangement the mounting system is configured such that when coupled the device support plate and the base mounting plate are configured to contact only at the couplings between the brackets and corresponding connectors.

The plates when coupled and interlocked are maintained at a separation from each other and the coupling is located therebetween. The coupling is provided between the plates at connections that have some resilience.

In another arrangement, the device support plate comprises first and second connectors configured for coupling with corresponding first and second brackets of a base mounting plate; wherein said first and second bracket and connector pairs when coupled are arranged in alignment about a common axis; and each connector and bracket being configured to allow rotation of one of said plates relative to the other about the common axis when coupled at the bracket and connector, and when fastened with a fastening element.

The arrangement of the mounting system provides for tilting or rotation of one of the plates relative to the other. The mounting system may further include a connector and bracket pair that is not in alignment with another connector and bracket pair. In this case, when the plates at connected at two non-aligned connector and bracket pair, the arrangement is static, tilting is not supported.

BRIEF DESCRIPTION OF THE DRAWINGS

The following drawings are provided as an example to explain further and describe various aspects of the present disclosure:

FIG. 1A is an exploded perspective view of a known common type of mounting arrangement for mounting an electronic device or module to a vehicle;

FIG. 4A is a view from above, FIG. 4B is a view from the front; FIGS. 4C and 4D are a cross-sectional views from the perspective of the front showing the fastening element and receiver prior to and after connection, these drawings show the detailed mating features of the components; FIGS. 4E and 4F provide close up views of the receiver before and after the fastening element is inserted, and 4F illustrates exemplary forces which provide a tightening of the coupling between the base mounting plate and the device support plate;

FIGS. 7A and 7B show a fastening element according to FIG. 5D located in a corresponding receiver;

DETAILED DESCRIPTION OF THE DRAWINGS

Figure 2A:
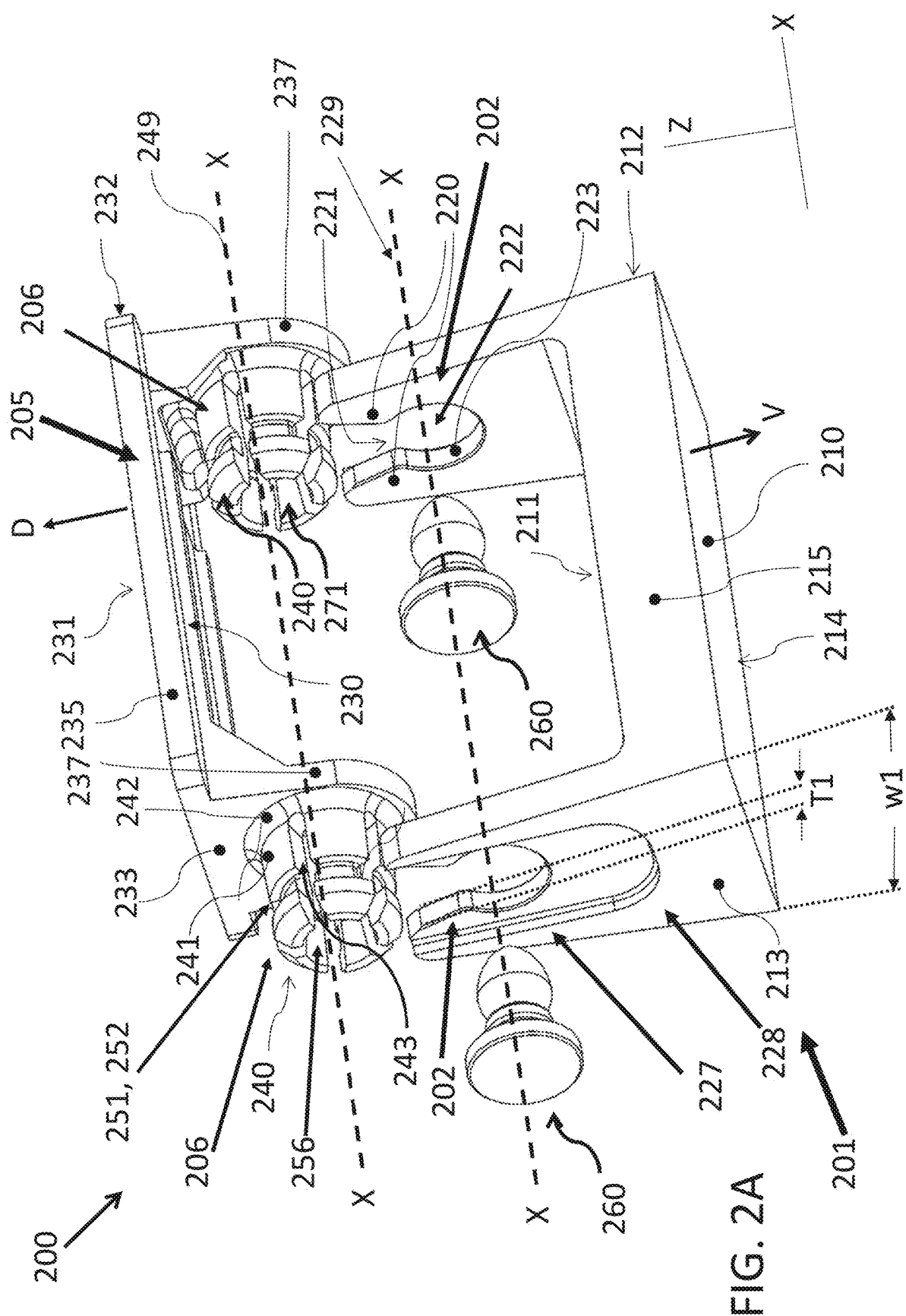
FIG. 2A is an exploded perspective view of a mounting system according to arrangements of the present specification.

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

For simplicity and clarity of illustration, reference numerals may be repeated among the Figures to indicate corresponding or analogous elements. Numerous details are set forth to provide an understanding of the examples described herein. The examples may be practised without these details. In other instances, well-known methods, procedures, and components are not described in detail to avoid obscuring the examples described. The description is not to be considered as limiting to the scope of the examples described herein.

FIG. 1A shows a common type of mounting system 100 for mounting an electronic component or electronic module to a vehicle. In the arrangement shown, two mounting members 120, 130 are provided. One of the mounting members 130, is arranged to hold the electronic device and the other 120 for mounting to the vehicle by a suitable fixing means. The mounting member 130 for holding the electronic device is of a plastic material and the mounting member 120 for mounting to the vehicle is typically of a rigid material such as a metal. To interface the two members such that they are coupled and held together, an alignment screw 150 and additional fixing means 140 are provided. There are problems associated with mounting electronic devices to a vehicle including that such an arrangement is often prone to emitting noises due to vibrations when used on a vehicle.

To overcome such disadvantages and provide an improved mounting system, arrangements according to the specification for mounting an electronic device or an electronic module to a vehicle are provided.

Referring to FIGS. 2A to 9 exemplary mounting systems 200 and 1200, 4200 for mounting an electronic device to a vehicle, are described.

Figure 2B:
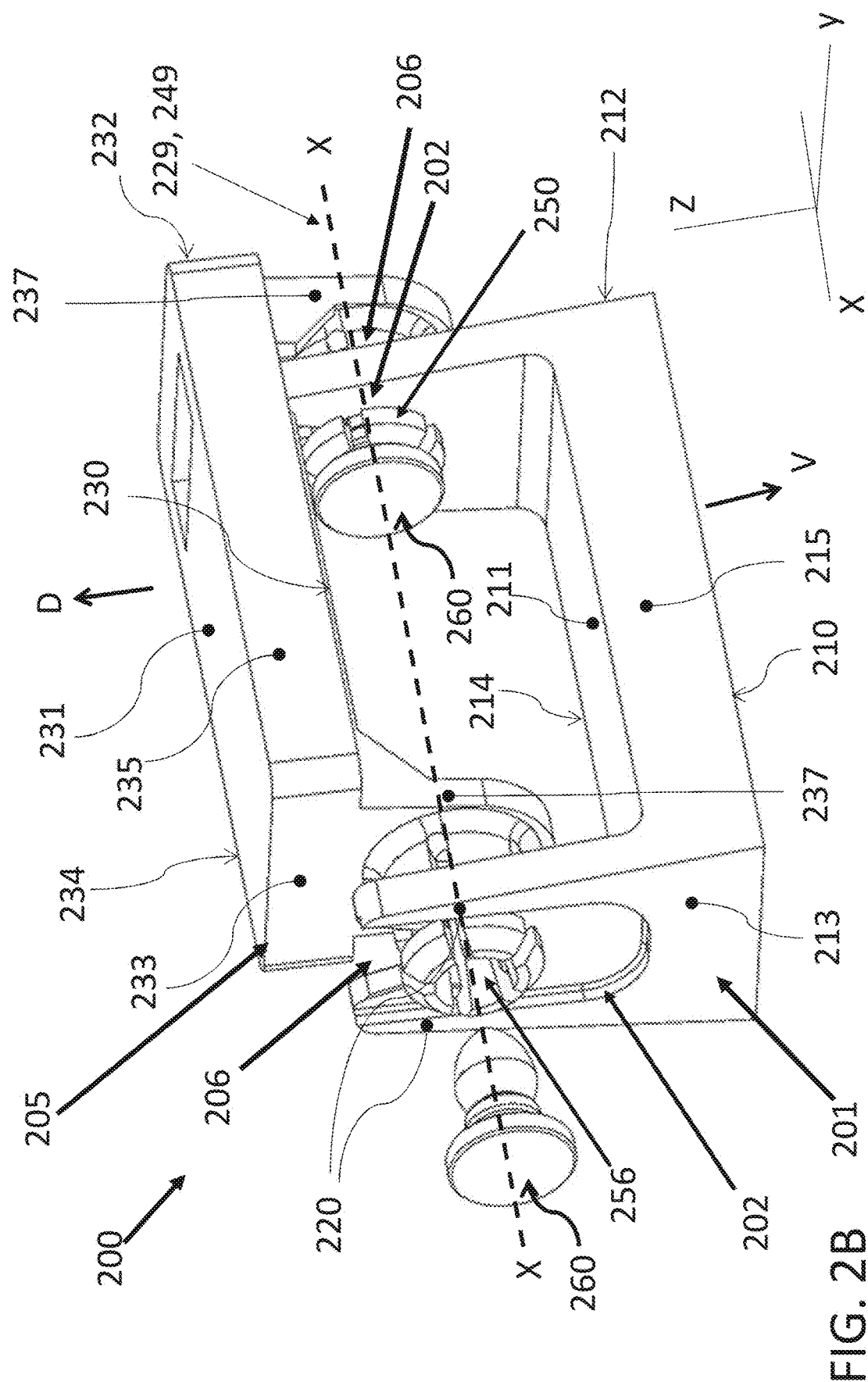
FIG. 2B is a perspective view of the mounting system when the parts of FIG. 2A are brought into alignment and are assembled together.

Referring initially to FIGS. 2A and 2B, a mounting system 200 is described. The mounting system 200 comprises a first base mounting plate 201, a second device support plate 205, and third fastening elements 260. The base mounting plate 201 is configured for mounting to a vehicle V and for connecting the device support plate 205 to the vehicle. The device support plate 205 is mountable to the base plate 201 and configured to receive and support an electronic device D. The mounting system 200 is essentially a three-part mounting system wherein the fastening elements are provided to secure the device support plate 205 to the base mounting plate 201.

The base mounting plate 201 comprises a first surface 210 configured to be vehicle facing (direction V) in use and a second surface 211 configured to be device facing (direction D) in use, in the arrangement shown. The base mounting plate 201 extends longitudinally (in the X direction) between first and second ends 212, 213 which extend between upper and lower longitudinal side edges 215 and 214 of the plate.

The base mounting plate 201 is configured to be fixed to the vehicle. The fixing may be by any suitable fixing means. The base mounting plate 201 is comprised of material that provides rigidity. The base mounting plate may be comprised of a metal material such as for example, Aluminum or steel. However, it will be appreciated that any suitable material having the required rigidity may be used. The base mounting plate 201 comprises first and second brackets 202. The brackets are configured for coupling with a corresponding member of the device support plates. The brackets 202 in the arrangement of FIG. 2 are located longitudinally spaced apart and extending outwardly from, and in a direction (Z) transverse to, the device facing surface 211 of the plate (the plate is shown in an in-use orientation in an X-Y plane in the drawings). The brackets 202 have arms 220 which define an opening 221 therebetween, and a receiver 222. The receivers 222 of the brackets 202 are arranged about a central longitudinal extending axis 229 (extending in the X-direction). The arms 220 are curved and the receiver 222 is generally circular or c-shaped in form, in cross-section. An internal peripheral surface 223 of the arms 220 defines a mating surface for mating with a corresponding feature of the connector 206. The brackets are rigid brackets. The brackets are formed integrally with the plate and are comprised of the same material. The brackets 202 may be formed at cut-outs in the plate and may be shaped therefrom (see for example FIG. 8A), alternatively the brackets may be welded or glued to the plate. The central axis 229 of the brackets 202 and the receivers 222 is located substantially parallel to the central longitudinal axis of the surface 211 of the plate 201. In the exemplary arrangement of FIGS. 2, the brackets 202 further comprise outer supports 227, 228, that extend transversely relative to the surface of the plate at lateral side ends 213 and 212. The first and second brackets 202 extend outwardly from the surface of the plate 201 and outer supports 227, 228 of each of the brackets extends substantially the width of the plate at the base thereof. The outer support 227 may taper inwardly relative to the base at the opening.

Accordingly, in the arrangement of FIGS. 2, each receiver 222 is located centrally relative to the surface of the base mounting plate 201, and centrally relative to the brackets 202. This arrangement provides an improved stability in the mounting of the plates to each other and of the electronic device to the vehicle.

The device support plate 205 comprises a first surface 230 configured to be vehicle facing in use (direction V) and a second surface 231 configured to be device facing in use (direction D). As shown in the drawings, the support plate 205 extends longitudinally (in the X-direction) between first and second ends 232 and 233 thereof and an upper longitudinal side 235 and a lower longitudinal side 234. Similar to the base mounting plate 201, the surfaces of the support plate 205 are arranged oriented in an X-Y plane, in an in use orientation, of the exemplary arrangement as shown in the drawings. In use, an electronic device or electronic housing may be coupled to the device support plate to mount it to the vehicle via the mounting system.

The support plate 205 comprises first and second connectors 206. The connectors 206 are configured to provide for connection of the support plate 205 to the base mounting plate 201 at the brackets 202. The connectors 206 and the brackets 202 are formed for conformity, and have corresponding mating features configured to interact, to facilitate the engagement of the connector of the support plate with the bracket of the base plate, as required.

In the arrangement of FIG. 2, the first and second connectors are located longitudinally spaced apart generally near opposing side ends 232 and 233 of the plate 205. The connectors 206 comprise a connector body 240 having a generally cylindrical form, or of generally circular form in lateral cross-section. The connector body 240 comprises a wall portion 241 and a base portion 242. The connector body 240 is defined by the wall 241. A central axis 249 of each connector 206 is arranged in the direction of the longitudinal axis (X-direction) of the support plate. The connectors 206 are connected to the plate 205 by means of a support 237. The support 237 is arranged extending outwardly from, and in a direction (minus Z-direction in the drawings) transverse to, the vehicle facing surface 230 of the plate 205 (the plate is shown in an exemplary in use orientation in an X-Y plane in the drawings). The connectors 206 are connected to the support at the base portion 242 thereof and extend in a direction essentially parallel to the plate.

The device support plate 205 may be comprised of a plastics material. However, it will be appreciated that any suitable material may be used. The device support plate and connectors are preferably formed of the same material to allow manufacturing using a common manufacturing arrangement. The connectors 206 of the device support plate 205 are configured to have flexibility and resilience. These properties may be achieved by the selection of material of the connectors but also by the form and configuration thereof, described further below.

The wall 241 of the connector is configured by virtue of the form thereof and in addition or alternatively by the selection of the material thereof, to have some resilience and to support flexing.

The connectors 206 are further configured for coupling with fastening elements 260. Each connector comprises a receiver 256 which is defined by a channel formed internally through the connector body 240, from an opening 271 to the base portion 242 and configured for receiving fastening elements 260.

Figures 3A, 3B:
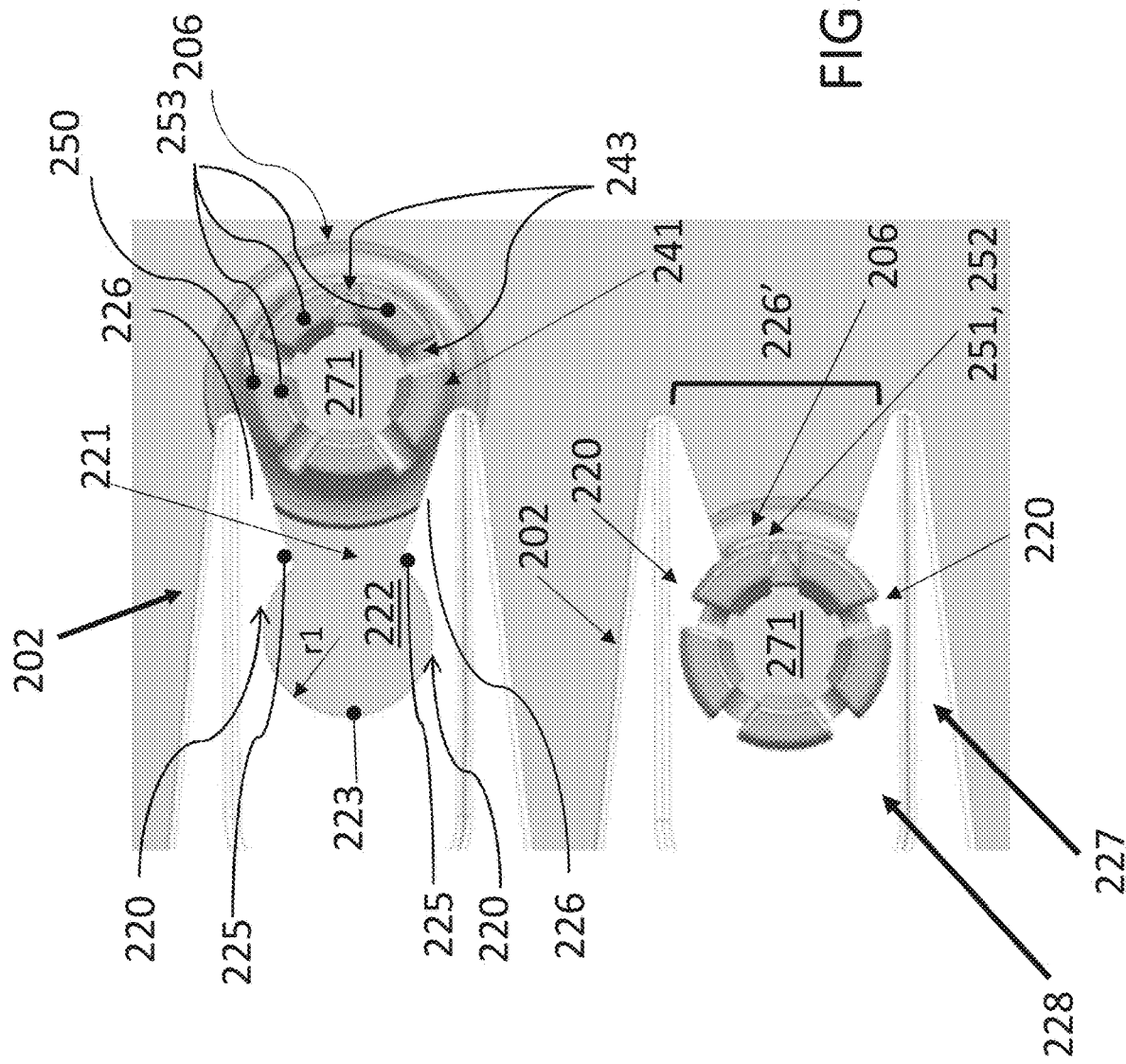
FIG. 3A is a side view a bracket of the mounting plate of FIG. 2A and a connector of FIG. 2A prior to connection.
FIG. 3B is a side view after connection when a portion of the connector is snapped into place within a bracket of the base mounting plate, according to arrangements of the present specification.

Referring to FIGS. 2 and 3A and 3B, the mating features of the brackets 202 and the corresponding features of the connectors 206 are described in more detail. An external peripheral surface 250 of said connector wall 241 comprises a bracket connector member 251 for coupling at a corresponding bracket 202. The bracket connector member 251 comprises a circumferential channel 252. The channel 252 is recessed from the external peripheral surface 250 of the connector 206. The channel 252 has a generally U-shaped channel form. The features of the channel 252 including depth and width are selected to conform with the mating portion of the bracket.

Referring to FIG. 3A, the arms 220 of the bracket 202 comprise locking elements 225 on each side of the opening 221. The arms 220 further comprise guide portions 226 which taper outwardly relative to the opening 221 and receiver 222 and which define a second locator opening 226'. The locator opening 226' is external to the receiver opening 221 and is wider. Together the guide portions 226 assist in locating a connector 206 of a support plate 205 into the receiver 222. The internal surface wall 223 of the arms 220 defines a mating surface for mating with a connector 206. The internal surface wall 223 extends circumferentially around the central axis 229 of the bracket receivers 202. The internal peripheral surface 223 of the arms 220 defines the receiver 222 having a radius r1 and a length T1 (FIG. 2A) in the axial direction 229.

To assemble the support plate 205 to the base plate 202, the bracket connector member 251 is brought into proximity with the bracket 202 and the channel 252 is aligned with the arms 220 of the bracket (see FIGS. 2B and 3A). The connector 206 is snap-fitted or push-fitted into the bracket 202 at the bracket connector member 251 (see FIG. 3B). The wall 240 of the connector is resilient and flexes for snap-fitting into the bracket. When the connector 206 is in an inserted position in the receiver 222 of the bracket 202, bracket arms 220 are then located in the channel 252. When coupled the internal peripheral surface 223 of the bracket 202 is located in the channel 252 and in contact with the base of the channel.

As shown in exemplary arrangement of FIGS. 3A and 3B, the wall 241 of the connector comprises the end wall members 253 spaced apart circumferentially about the opening 271. The end wall members 253 are located proximally of the bracket connector member 251 and channel 252 and separated by slots 243.

When the support plate 205 and mounting plate 201 are coupled, the axis 229 through the receivers 222 of brackets 202 and the axis 249 of the connectors 206 and fastening elements 260 are brought into alignment. When aligned and coupled, the fastening elements 260, the receivers 256, the bracket connector members 251 and channels 252, and the brackets 202 are all concentrically arranged around the central longitudinal axis (229, 249) of the coupling. These concentrically arranged features define the couplings between the plates. Each coupling is essentially a dual layer coupling or two-way coupling.

As noted above, in the exemplary arrangement of FIG. 2 the two plates are coupled about a common longitudinal axis, through the two brackets, connectors, and fastening element. This arrangement provides further advantages of the mounting system 200. In particular, by virtue of the arrangement of the coupling of the mounting system about a common axis, is possible to change the angle or tilt of one of the plates relative to the other by rotating it or moving it about the coupling. The coupling is tightly engaged when fastened however, with the application of force it is possible to provide some tilting. It is also possible to provide tilting or rotation about the common axis at the bracket to connector coupling, before the fastening elements are engaged in the connectors. This arrangement is advantageous for allowing accurate positioning an electronic device or electronic module on a vehicle. It is possible to further adjust the position of tilt of one of the plates relative to the second in situ at the vehicle, when one of the plates has been fixed to the vehicle and the other coupled to the first.

In the exemplary arrangement of FIGS. 2, the central longitudinal axes of the coupling are located centrally between the plates and in alignment with the central longitudinal axes of the plates. In this arrangement, there is no surface to surface contact between the plates, the contact between the plates is at the coupling of the connector members and bracket members only. The plates 201 and 205 are spaced apart from each other and the coupling is located between the plates.

The plates, in the arrangement of FIG. 2, are therefore advantageously coupled at the connectors and brackets only. The connectors by their form and configuration are resilient and have some flexibility to allow for ease of assembly. When the three components, namely the fastening elements, connectors, and brackets are engaged, the connectors are then effectively retained in a rigid fastened position between the two more rigid components on with side of the connector wall.

Further, in the exemplary arrangement of FIG. 2B when coupled the surfaces of the two plates are located offset longitudinally to each other. The ends of the plates are not aligned. The plates are offset by a distance related to the location of the bracket connector member of the connector 206. In the arrangement of FIGS. 2, the connectors 206 are both located to the left-hand side of the connector supports 237 and the receivers are arranged in the same direction-such that both fastening elements are inserted from the left.

It will be appreciated that the direction of the connectors and the receivers may be arranged differently, for example as shown in FIG. 8 which provides that both receivers are arranged in opposing directions and the fastening elements are inserted from opposite sides of the plates.

While the base mounting plate and device support plate are shown in a particular exemplary arrangement and orientation in FIGS. 2, it will be appreciated that they may also be provided in different in use arrangements, as may be required for different applications. Similarly, while each plate of the arrangements of FIG. 2 has two brackets and two corresponding connectors, it will be appreciated that the form of the plates may be different from that of the example and a different number of brackets or connectors may be provided. Further, the brackets and connectors may be located at different parts of the plates than shown in the exemplary drawings.

While the arrangement including two brackets and connectors in alignment about a common axis (X) allows for tilting of the plates relative to each other about the coupling, the mounting system 200 may comprise at least one further bracket and corresponding connector pair at a different location on the plate and not aligned with said common axis. While the mounting system when connected at aligned couplings, as shown in FIG. 2, is configured to provide some relative tilting or rotation about the couplings. If the plates are coupled including at a non-aligned bracket and corresponding connector pair, then the relative positions and angles of the plates will be fixed and static (see exemplary arrangement of FIG. 9).

In the non-fastened position, the connector 206 is configured to flex and to have resilience. In particular, the arrangement provides for flexing of the wall portion 241 so that the connector 206 can be inserted into the bracket 202, and further allows flexing at the wall 241 so that the fastening element 260 can be inserted into the receiver 256.

In the fastened position, all three parts of the coupling of the mounting system are engaged and tightened. When engaged, the connector wall 241 is effectively located between the fastening element and bracket i.e. between two relatively rigid parts and as a result, no longer flexes in the manner that it can in the non-fastened positioned. Rather, when all three parts (bracket, connector and fastening element) are engaged the interfaces between these components are tightened. As a result, the components are interlocked and the mating surfaces and counter surfaces are effectively clamped or tightly engaged.

The fastening element, the connector, and receiver are all formed for mating and comprise corresponding features. The form and features and dimensions of each are provided to provide secure fastening of the fastening element in the fastened position of the receiver. Further the form, features and dimensions of each are provided to allow the controlled application of forces for interlocking of the coupled bracket and bracket connector member of the connector. Further the layers of each component at the coupling i.e. the innermost fastening element, which is surrounded the connector which in turn is surrounded by the bracket are concentric and the engaged circumferentially. The coupling is therefore about a common axis and the circumferentially engaged components advantageously allow for some rotational movement about the common axis.

The securing of the mounting system 200 to the vehicle and the provision of a secure support for the electronic device or electronic module, is based on the three-way interaction of each of the first base mounting plate, the second device support plate and the third fastening elements. Each of these components is configured for interaction directly or indirectly with the two other components. The components are formed for interaction and mating and further formed to provide controlled forces between the components. Fastening elements 260 are configured to interact directly with the connector and indirectly via the connector with the base mounting plate 201. Different portions of the connector 206 interact directly with both the fastening elements 260 and the base support plate 201. The fastening elements 260 interact with the support plate 205 in a direction orthogonal to the direction of interaction of the mounting plate 201 and the support plate 205. As noted above both, of the two-way couplings are concentrically arranged.

Referring to FIGS. 4A, 4B, 4C and 4D, further details of features of exemplary connector 206 including a receiver 256 formed internally in the connector body and a corresponding fastening element 260 receivable therein, according to the specification, are further described.

As described above and shown in the perspective view in FIGS. 4A and 4B, the components shown in FIG. 4 including the fastening element 260, connector 206 and bracket 202 are of a generally circular cross-section in the lateral or radial direction. Referring to FIG. 4A the fastening element 260 is shown in alignment with connector 206 which is engaged with the bracket 202.

Each component when aligned or in the fastening position is arranged around a common central axis 249, in the X direction. The interactions of the components include those between the circumferential peripheral surfaces of the fastening elements and of the connectors, receivers and brackets.

The fastening element 260 comprises an elongated body 261 that extends from a head portion 268 at a proximal end to a tip 269 at a distal end. The fastening element comprises a plurality of engagement members 264, 265-1, 265-2 which are arranged axially about a central longitudinal axis 249. An external peripheral wall of each of the engagement members defines a mating surface for engagement with corresponding portions of the internal peripheral surface 255 of the receiver 256.

The engagement members of the fastening element have radial dimensions conforming to the radial dimensions of the receiver. The fastening element 260 acts as an expander or expansion member when positioned in the receiver. The overall form of the fastening elements of the specification is different to, and contrasts to, the pin of FIG. 1A which shows a previous arrangement. The pin of FIG. 1A is a relatively narrow pin having a body of cylindrical form and of a constant radius in lateral cross-section from the head to end. In contrast, the fastening element 260 has a body having a number of engagement features arranged axially and formed to provide interaction with and expansion at the connector and receiver. The fastening element is not of constant diameter or radial extent, the different engagement features each have a particular form and radial extent. The fastening element of the specification comprises at least two engagement members having peripheral surface for engaging a corresponding counter surface of the receiver.

Referring to FIGS. 4A to 4D, a first engagement member 264 is configured to interlock with a retainer 275 of the receiver 256. The first engagement member 264 is defined by a portion of a main body 267 of the fastening element. The body 267 is of a generally ovoid form and extends between a neck portion 263 near the base end of the ovoid to a distal end 269 at the tip end. The first engagement member 264 in the arrangement of FIG. 4 is defined by a curved shoulder portion 264 that extends outwardly between the neck 263 and widest portion 262 of the ovoid body 267 near the minor axis thereof. An outer peripheral surface 264' of the curved shoulder portion 264 is in use configured to contact and engage with a retainer 275 of the receiver 256.

While the main body of the fastening element 260 is of generally ovoid form it will be appreciated that other suitable forms may be used, for example, a generally egg shaped, ellipsoidal or spherical form may be provided.

The plurality of engagement members furthers comprises annular contact members 265-1 and 265-2 separated by a recessed channel 266. The external peripheral walls 265-1', 265-2' of the contact members 265-1 and 265-2 define mating surfaces configured for engaging with corresponding portions at the guide 272 of the inner peripheral wall 255 of the receiver 256, when located in the fastened position. The contact members have a generally tapered cylindrical or frustum form. The external peripheral walls 265-1', 265-2' are tapered inwardly in the direction from the proximal end to the distal end of the fastening element, reflecting the form of the receiver. The annular contact members 265-1, 265-2 are located between the head 268 and the main body 267 and are configured to mate with a guide portion 272 of the inner peripheral surface 255 of the receiver 256. The proximal head portion 268 has a radial extent greater than that of the body 267 and contact members 265. A radial step 268' is provided between the head and first contact member 265. In use, in the arrangements of the drawings the head portion 268 remains outside the receiver 256 when the fastening element is engaged.

The fastening element 260 and receiver 256 are configured to provide a controlled application of forces therebetween, based on their interaction at the plurality of engagement members. As a fastening element 260 is inserted into the receiver 256 the forces arising from the interaction include forces in radial and axial directions.

Figure 4A:
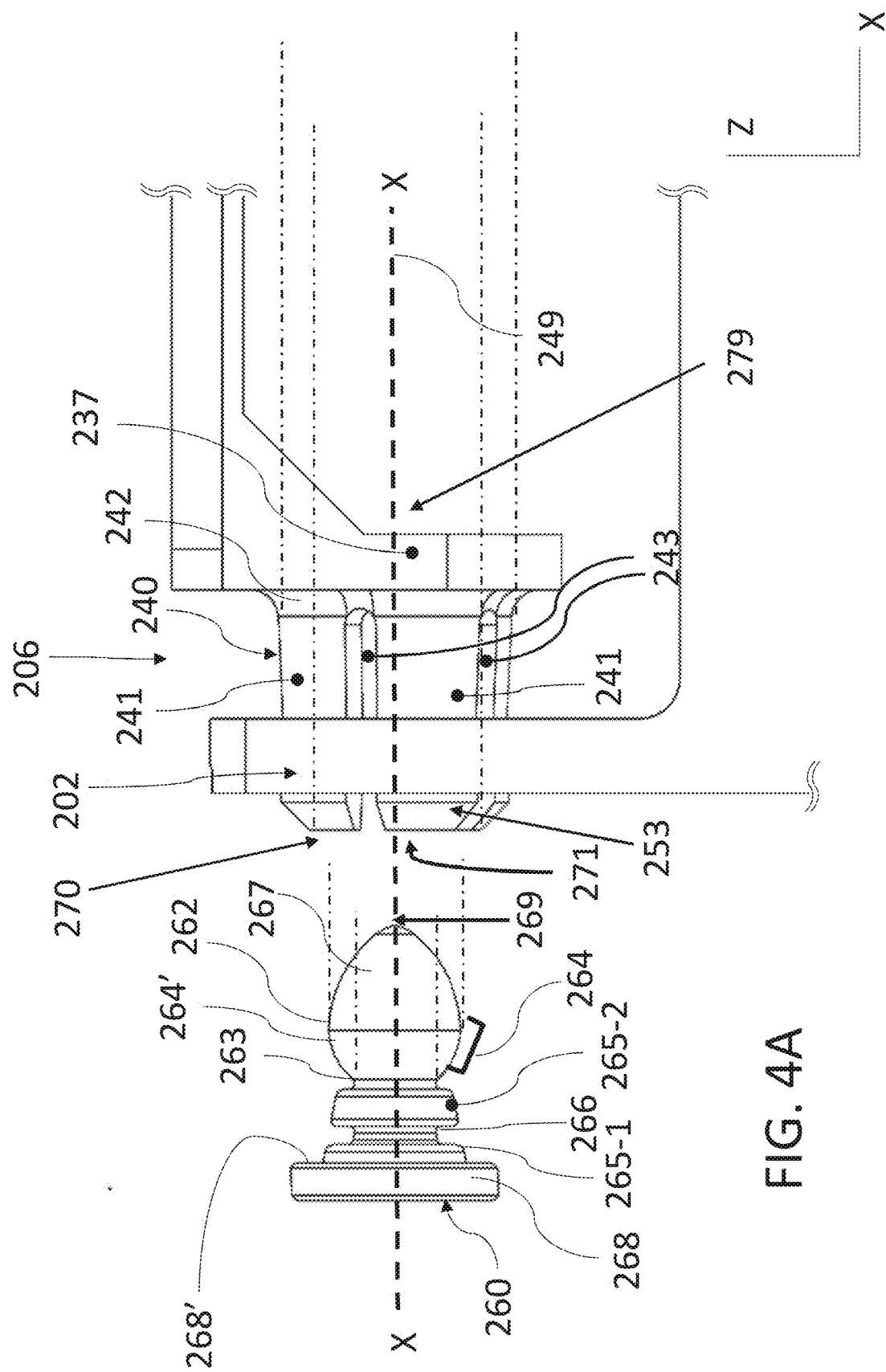
FIGS. 4A, 4B, 4C, 4D, 4E and 4F are views of an arrangements of the coupling elements of base mounting plate including the bracket, and of the device support plate including the connector and the fastening element, prior to and after connection.
Figure 4B:
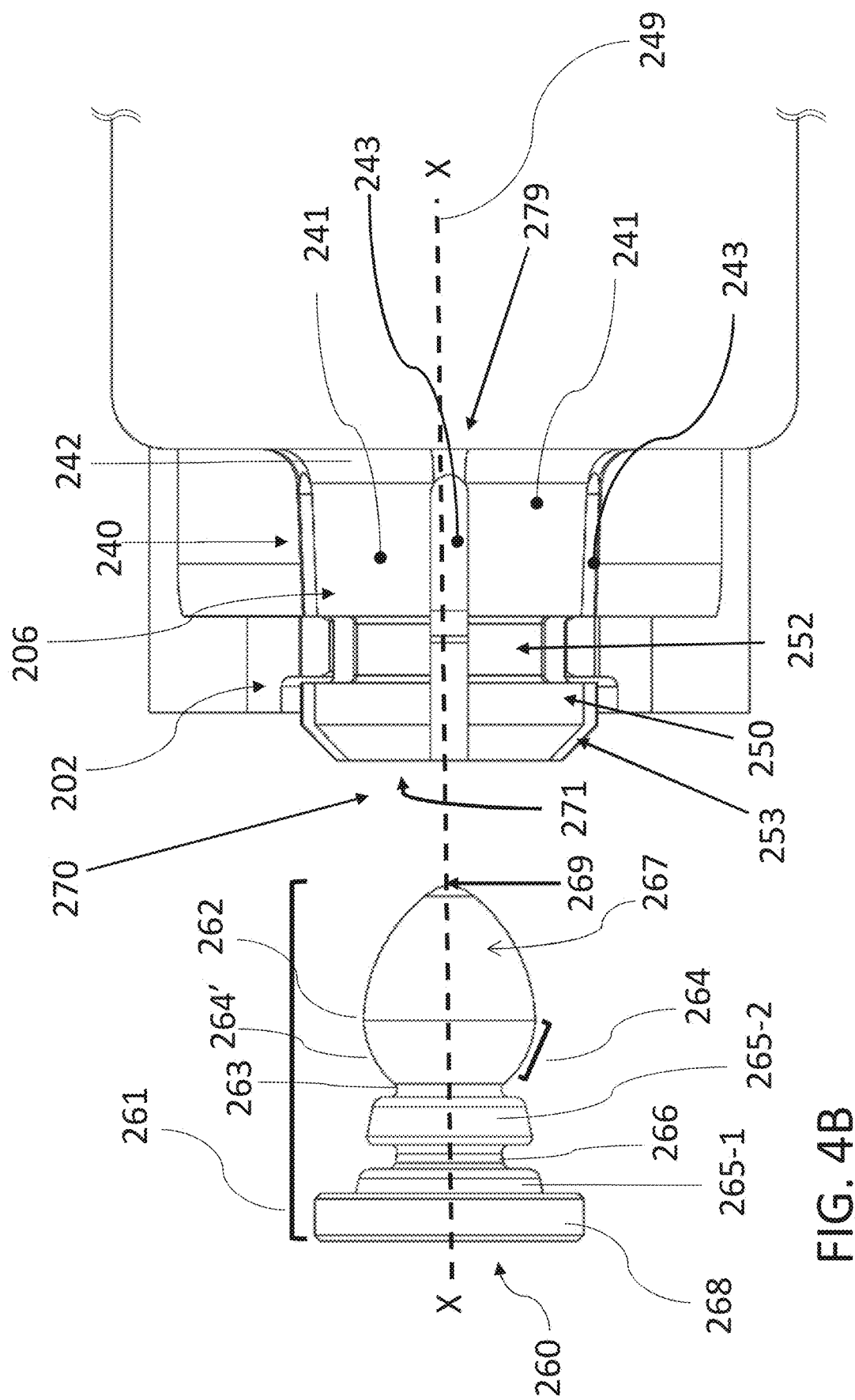
Figure 4C:
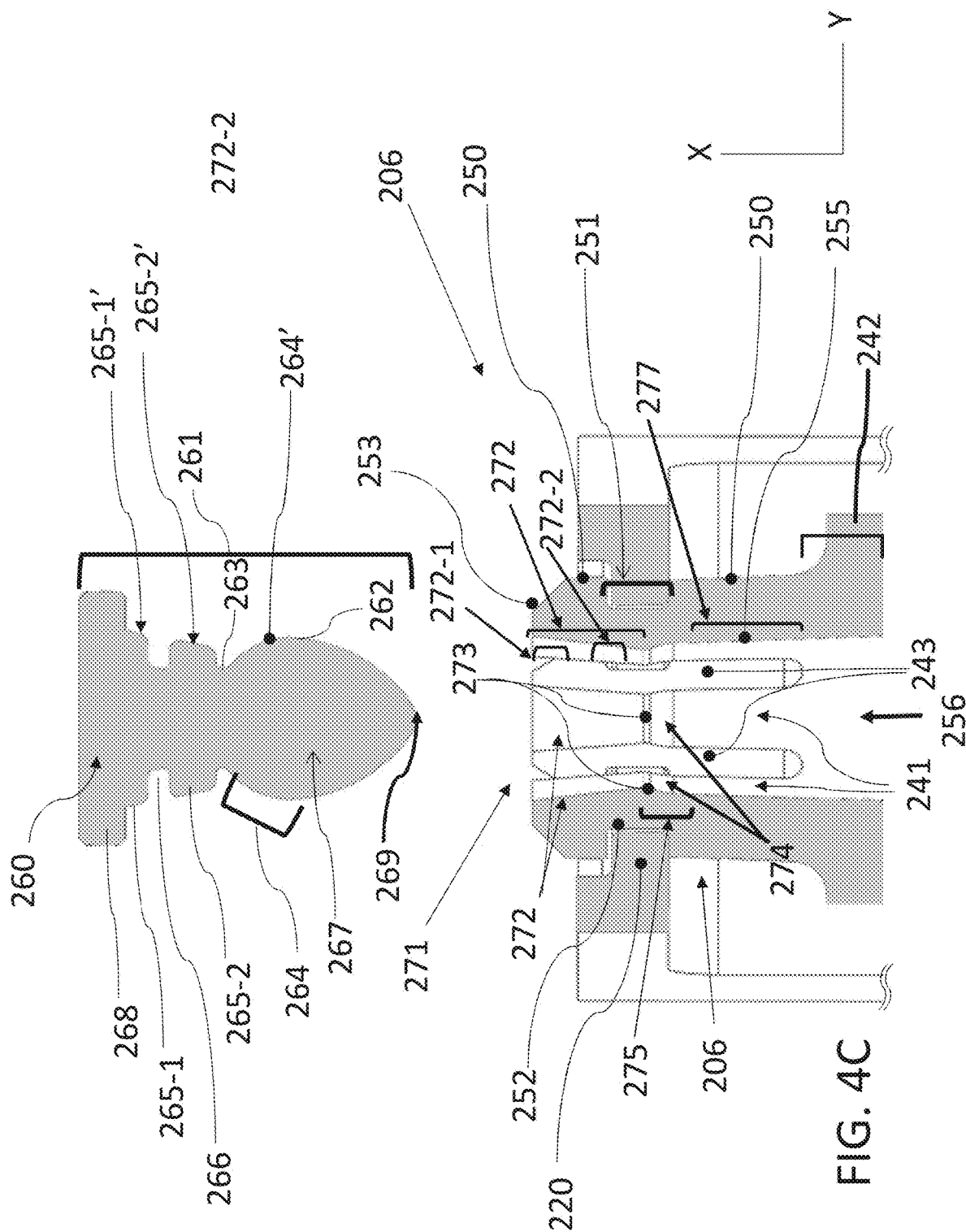
Figure 4D:
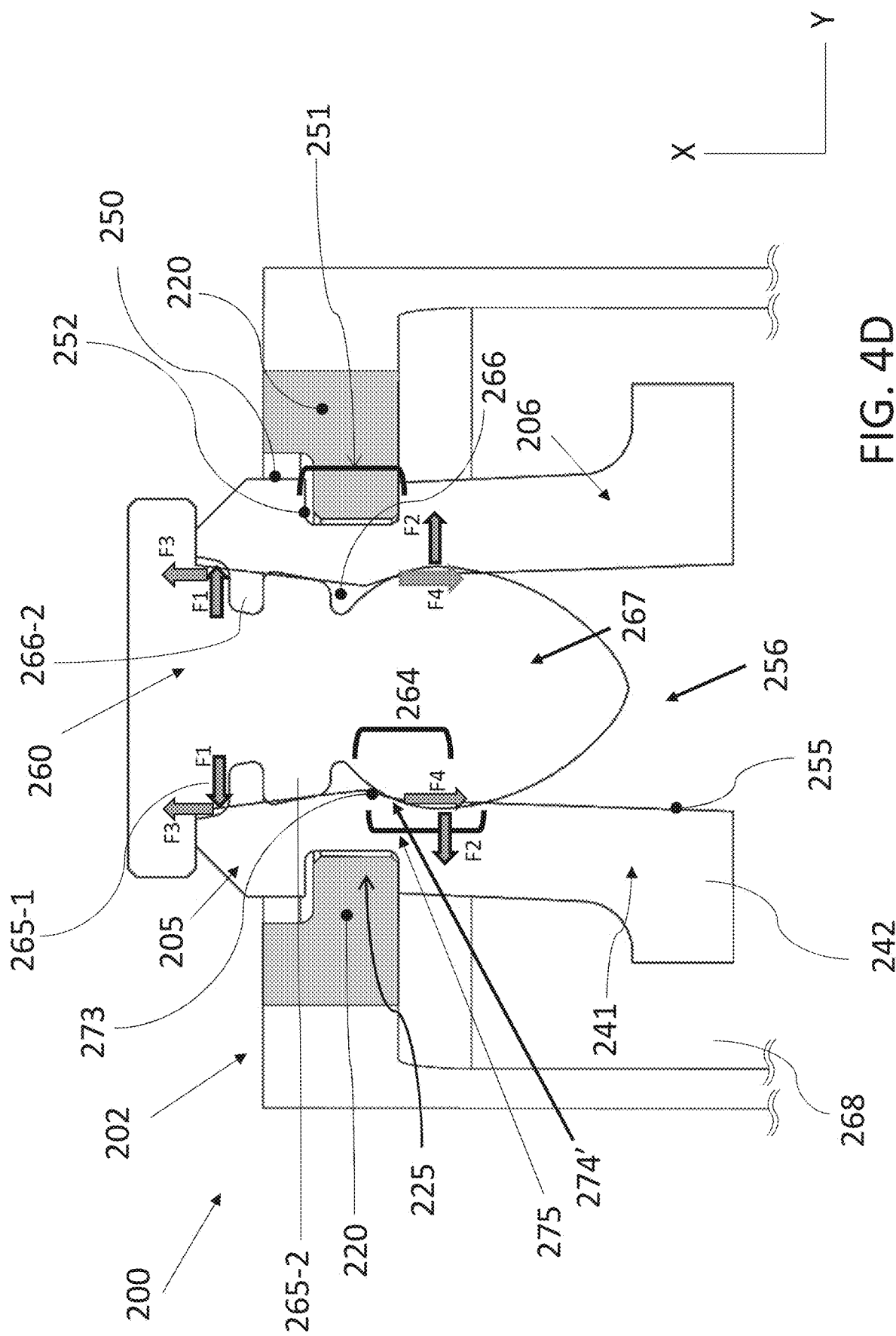

Referring to FIGS. 4A to 4D, an exemplary receiver 256 and connector 206 according to an arrangement of the specification are described in further detail. The receiver 256 is defined by a channel that extends through the interior of the connector 206. FIGS. 4A and 4B provide external side views and FIGS. 4C and 4D provide cross-sectional views in a lateral and longitudinal direction of the components (radial and axial directions of the connector, fastening element and bracket).

Connector 206 according to FIG. 4 comprises a connector body 240 having generally cylindrical form which is defined by a connector wall 241. Other suitable forms may be used for example a tapered cylindrical form or frustum. The connector wall 241 extends from a proximal end 270 to a distal end 279. The wall 241 comprises an external peripheral surface 250 and an internal peripheral surface 255. In the arrangement of FIGS. 4A and 4B the body 240 and external peripheral wall 250 tapers outwardly at the distal end 279 relative to the proximal end 270. The external peripheral surface 250 comprises a connector mating member 251 defined by a circumferential channel 252 formed recessed relative to the external peripheral surface 250.

The wall 241 in the arrangements illustrated in FIG. 4 (and FIG. 2) is comprised of two or more wall portions 241-1, 241-2, to 241-n. The wall portions are circumferentially spaced apart around the central axis of the connector 206. The wall portions extend in the longitudinal direction (axial direction). The wall portions are spaced apart by one or more slots 243. In the arrangement of the drawings a plurality of slots 243-1, 243-2, 243-n are provided circumferentially spaced apart. The channel 252 of the external peripheral surface 250 is made up of channel portions 252-1, 252-2, 252-n, each wall portion comprising a portion of the circumferential channel. The wall portions 241 further comprise end wall members 253 located at the proximal end of the connector about the opening 271. The external peripheral wall 250 is tapered inwardly in the direction of the opening 271 at the end wall members 253.

The internal peripheral surface 255 of the wall 241 defines the mating surface of the receiver 256. The wall 241 is configured to flex and to be displaced under forces applied between the fastening element 260 and the internal peripheral surface 255. This includes forces applied by the fastening element at the guide portion 272 and at the retainer 275. The flexing is supported by the form of the connector wall 240 including: by the provision of slots 243 and wall portions 241-1, 241-2 to 241-n. The flexing may also be supported by the selection of the material of the connector. The receiver 256 and the fastening element 260 are formed to have corresponding features and are of related dimensions to provide for the mating of the fastening element in the receiver.

The receiver 256 and the internal peripheral surface 255 of the wall comprise features to affect the interlocking. With reference to FIGS. 4C and 4D, it is noted that the internal peripheral wall 255 of the receiver 256 comprises a number distinct axially arranged portions or regions. The receiver 256 extends between the proximal end, at which the opening 271 for receiving the fastener 260 is located, to the distal end 279 at which the base portion 242 connecting the connector 206 to the support plate 205 is located.

Referring to FIG. 4C, the receiver 256 comprises in the axial direction from the proximal end to the distal end: the opening 271, guide portion 272, retainer portion 275, body portion 277, and base portion 242.

From the proximal end 270 of the connector, the opening 271 defines the widest portion of the receiver. From the opening 271, the internal peripheral wall 255 tapers inwardly to form the tapered guide 272 which extends to the retainer 275. The body portion 277 of the receiver extends in a distal direction from the retainer portion 275 to the base portion 242. The guide portion 272 further comprises a first proximal area 272-1 configured to engage with a first contact member 265-1 of the fastening element and a second mid area 272-2 configured to engage with a first contact member 265-1 of the fastening element.

The retainer 275 as shown in the exemplary arrangement of FIGS. 4C and 4D comprises a ridge 273 which defines the narrowest axial portion of the receiver 256 and a recess 274. The ridge 273 and recess 274 together define the retainer 275. The ridge 273 comprises a circumferential ridge which projects into the internal space of the receiver relative to the internal peripheral wall 255. The recess 274 presents a widened portion of the retainer adjacent to the ridge. The ridge 273 is provided at a junction of the internal peripheral wall between a narrowed end portion of the tapered guide 272 and the recess 274. The internal peripheral wall tapers outwardly at the recess. There are changes in the directions and the angles of incline of the tapered portions of the internal peripheral wall at retainer and the recess. The internal peripheral wall 274' of the recess 274 tapers outwardly relative to the ridge 273 and the central axis. The wall 274' has a curved form that conforms to the curved shoulder portion 263 of the fastening element 260. The ridge 273 and the recess wall 274' define a mating surface that in use when the fastening element is in the fastened position engages with the mating surface 264' of the fastening element. The opposing mating surfaces are effectively clamped when engaged.

Taking account of the configuration of the receiver and fastening element it will be appreciated that as the fastening element is inserted into the receiver, the body 267 of the fastening element will interact with the receiver 256 to cause the wall 241 to flex to allow location of the body 267 in the retainer 275. The location of the body 267 distally of the ridge 273 requires a displacement of the wall portions 241 to allow the widest portion 262 of the body 267 to be advanced distally of the retainer 275.

When the receiver 256 is in the rest position (the fastening element is not located therein), the radius of the receiver 256 at the ridge 273 is less than the radius at the opening or the radius at the body portion 277 or the base 242 of the receiver.

While the retainer 275 of the exemplary arrangement of FIG. 4 is defined by ridge 273 and recess 274, it will be appreciated that receivers comprise one of more retainers of suitable alternative form may be provided. The retainer is configured to conform to the form of an engagement member of the fastening element and to provide engagement thereof in the fastening position. A portion of the external peripheral surface of the fastening element defines a mating surface for engaging with a corresponding mating surface defined by a portion of the internal peripheral surface of the receiver. The opposing mating surfaces abut and are effectively interlocked or clamped and the fastening element is retained in the receiver.

When the fastening element 260 is located in the fastened position, several portions of the external peripheral wall of the fastening element 260 interface with corresponding portions of the receiver, by virtue of their configurations.

As described above and with reference to FIG. 4D, the main body portion 267 of the fastening element 260 is retained in the fastened position at the retainer 275 at the engagement member 264. In addition, the external peripheral surfaces at the contact members 265-1 and 265-2 interface with and are in contact with the receiver at corresponding spaced apart locations 272-1 and 272-2 of the guide portion 272. Therefore, the fastening element 260 is engaged circumferentially with the receiver 256 at multiple locations including at the retainer 275, guide portion 272 and opening 271.

The forces that arise due to the interactions of the contact members 265-1 and 265-2 and the receiver are also active in the coupling and securing of the fastening element and receiver, and the connector and bracket. Selected exemplary forces resulting from the interaction of the receiver and fastening element are described with reference to FIGS. 4D and 4F. The receiver and fastening element are configured to provide controlled forces therebetween.

The forces include forces F3 and F4 in opposing axial directions which act to maintain the fastening element in the receiver. The forces further include forces directed generally radially or outwardly relative to the central axis, these forces which provide for a flexing of the receiver 256, and the connector wall 241 which in turn provides for a tightening at the coupling of the bracket arms 220 in the channel 252 of the bracket connector member 251. These forces include for example forces F1 and F2 directed generally radially, as shown In the FIG. 4D. The tightening is between all of the internal walls of the U-shaped channel and each of the corresponding 3 surfaces of the arms 220 of the bracket. The corresponding surfaces of the arms 220 of the brackets include the inner peripheral surface 223 and the external side walls adjacent to the receiver. While illustrated in cross-section in FIG. 4D, it will be understood that the forces are active circumferentially between the concentrically coupled members.

Forces F3 and F3' arise from the interaction of contact members 265-1, 265-2 of the fastening element and the receiver at the corresponding regions of the guide portion 272. Forces F4 arise from the interaction of the engagement member 264 of the fastening element and the receiver at the retainer 275. The interactions are at axially spaced apart locations. The forces F3 (F3') and F4 are directed generally axially in opposing directions.

Figure 4E:
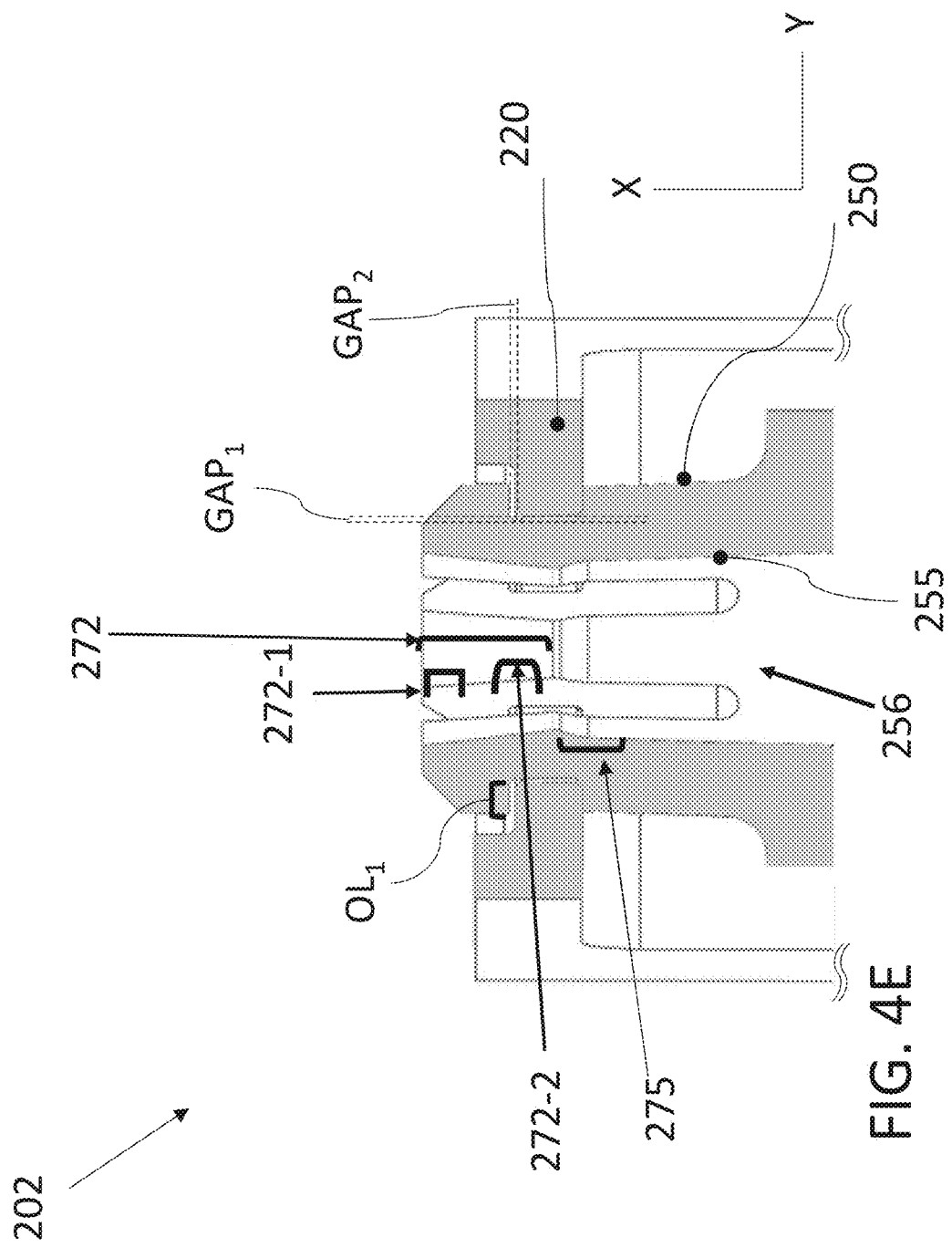
Figure 4F:
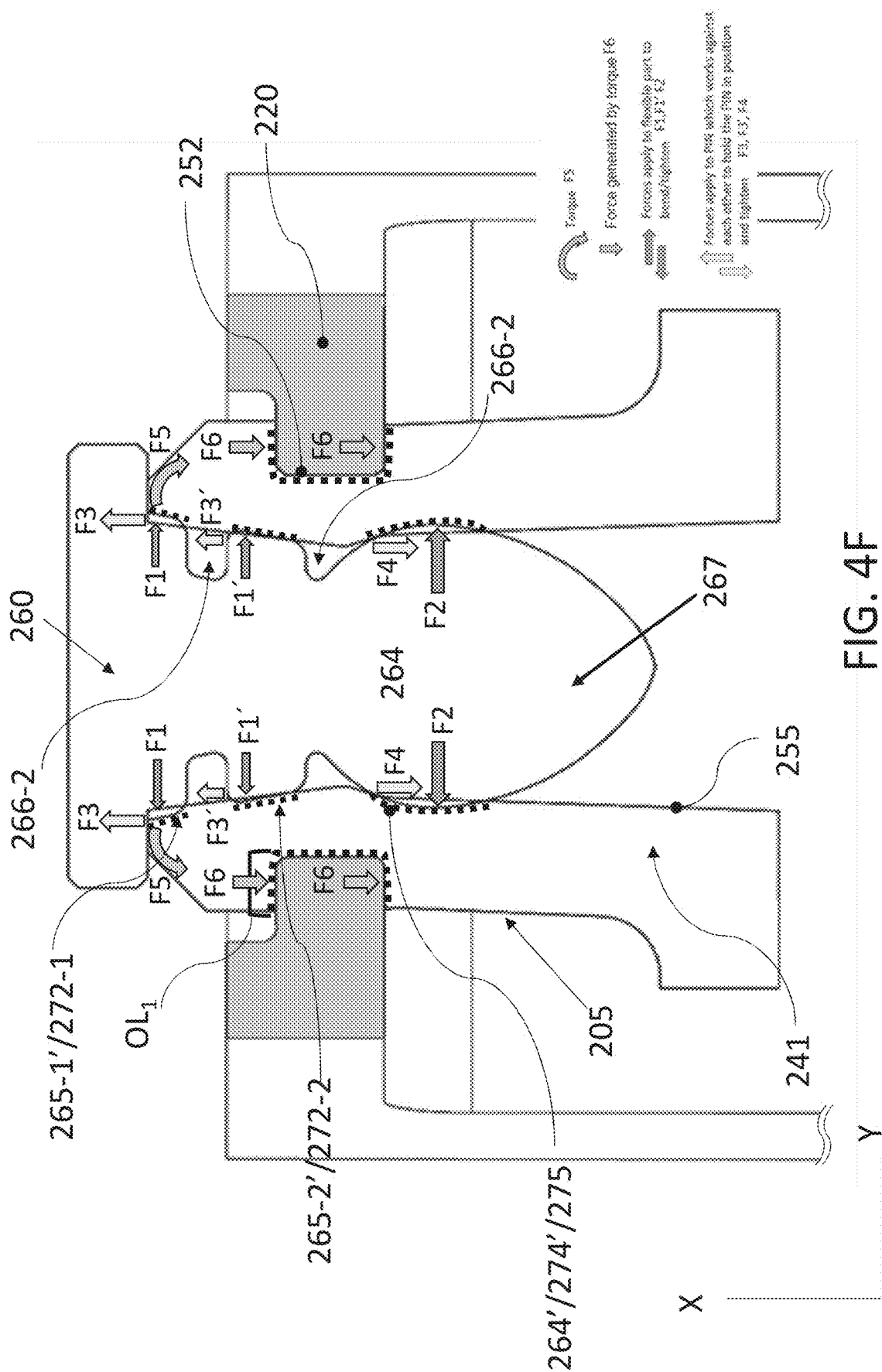

Referring to FIGS. 4C, 4D, 4E and 4F, the forces arising from the interaction of the fastening element and receiver and the effects at the coupling of the bracket 220 and channel 252 are described further. Forces F1 (and F1') arise from the interaction of contact members 265-1 of the fastening element and the receiver at the guide portion 272. Referring to FIGS. 4F, the interaction between the mating surface 265-1 and the area 272-1 of the guide portion where these respective surfaces contact is shown. Forces F3 similarly arise from the interaction of the contact member 265-1 and the guide portion of the receiver. The interactions are between the external peripheral portion 265-1' of the fastening element and the internal peripheral wall 255 at the mating region 272-1 of the guide portion.

Forces also arise from the interaction between the second contact member 265-2 and the receiver. In particular, as shown the external peripheral surface 265-2' contacts the area 272-2 of the receiver, and the forces includes forces F3' and F1'.

Forces F2 arise from the interaction of the engagement member 264 of the fastening element and the receiver at the retainer 275. Forces F4 similarly arise from the interaction of the engagement member 264 and retainer of the receiver. The interactions are between the external peripheral portion 264' of the engagement and the internal peripheral wall 255 at the retainer 275.

The interactions at the contact member 265 and the receiver are at axially spaced apart locations relative to the interactions at the engagement member 264 and the receiver. The forces, for example the exemplary forces F1 and F2 are directed generally outwardly, including in directions generally radially outwardly and orthogonal to or at an angle relative to the central axis. The interactions between the fastening element and receiver are circumferential and the forces F1 and F2 are active circumferentially. These exemplary forces F1 and F2 are examples of the forces relating to the flexing of the receiver and which provide expansion of the receiver.

The fastening element does of the exemplary arrangement of FIG. 4 is not configured to provide a continuous contact between the external peripheral walls thereof and the internal peripheral wall of the receiver. Instead, the contact members 265-1 or 265-2 and the engagement member 264 are separated by recesses and are configured to contact the receiver at corresponding locations including the proximal region 272-1 of the guide portion 272, the mid region 272-2 of the guide portion, and the retainer 275. The provision of spaced apart contact and engagement member—which are spaced apart by recesses provides for control of the direction of forces between the fastening element and the receiver and for control of the directions of flexing.

As shown in FIGS. 4D and 4F, the bracket connector member 251 and channel 252 are located on the external peripheral surface 250 of the connector at a location between the retainer 275 and the area 272-1 at which the contact member 265-1 contacts the guide portion.

The forces between the connector wall 241 and the bracket 202, arising from the insertion of the fastening element, therefore include outwardly directed forces which are applied to the connector wall 241 distally and proximally of the channel 252 including forces F1, F1' and F2. As a result, there is provided a flexing of the connector wall including forces for example in the directions F5 and F6, which provide for a tightening of the coupling between the bracket 220 and the channel 252 and for securing the bracket in the channel. The forces include torque in the direction F5 and forces generated by the torque in the direction F6, as shown.

Looking further at the overall interactions and for example the bending forces F5 and F6, it is noted that the external peripheral wall 265-1' is also active in providing expansion by application of the forces at 272-1 which provides a bending in directions including F5 of the proximal end of the connector walls 241 where there is mating between the surface 265-1' and the surface 272-1 of the receiver. Further forces F6 are generated by the torque.

These interactions are supported by the tapered form of the external peripheral wall 265-1' of the contact member 265-1 and the tapered form of the guide portion 272 of the receiver 256 including at the contact area 272-1. These interactions are further supported by the tapered form of the external peripheral wall 265-2' of the contact member 265-2 and the tapered form of the guide portion 272 of the receiver 256 including at the contact area 272-2'.

The channel 252 defines a recessed portion of the external peripheral surface 250 of the connector wall 241. As described above the channel is a circumferential channel. The connector wall flexes in the direction of the channel under application of forces at the retainer 275 and the upper guide portion 272-1 distally and proximally of the channel. The forces include forces in the directions shown as F5 (torque) and F6 (forces generated by torque). The connector 206 and the channel has flexibility and resilience and tightens around the more rigid arm 220 of the bracket 202.

Referring to FIG. 4E, the coupling between the bracket 220 and the channel 252 before insertion of the fastening element, is shown. As described, the coupling is by snap-fitting and as shown, there may be some gaps (gap 1 and gap 2) between the walls of the channel 252 and the corresponding portion of the arms 220 of the receiver. Referring to FIG. 4F, regions 272-1, 272-2, and 275 of the receiver which interact with the contact members and engagement member of the fastening element. In addition, it is shown that the displacement or flexing of the receiver walls results in a tightening of the coupling of the bracket arms 220 in the channel. The gaps that were shown in FIG. 4E are now closed and the base and side walls of the U-shaped channel 252 are clamped in a tight fit against the inner peripheral surface 223 and side walls of the bracket. The overlap between the side walls of the channel 252 and of the arms 220 of the bracket is shown in FIGS. 4E and 4F as OL1. The overlap OL1 depends on the depth of the channel 252. The gaps that are indicated between the internal surfaces of the channel 252 and the corresponding portions of the arm of the bracket are closed as the coupling tightens. This tightening is also supported by the channel which is formed of a relatively flexible plastics material being moved into close engagement with the corresponding walls of the more rigid bracket.

The F5 is the torque generated from F1. The F6 is the force generated from torque F5. Forces F1' and F3' which are weaker than F1 and F3. The figures also show in dash line the areas of interaction between the pin (also referred to as the fastening element) and the flexible snap feature (also referred to as the connector).

The fastening element 260 exerts force on the connector at the internal peripheral wall. The wall 241 of the connector is displaced under the application of the forces and brought into contact with the bracket. The connector wall 241 is configured to be resilient to allow for snap-fitting to the bracket and to allow insertion of the fastening element. When both the fastening element 260 and the bracket 202 are engaged with the connector 206, each of these more rigid components (fastening element and bracket) exerts a counterforce to the clamped portion of the connector 205 which is then constrained and maintained in a fixed state. When interlocked between the fastening element and bracket, the connector 205 does not flex as it does when in the rest position.

The receiver 256 is configured to receive the ovoid shaped elongated body portion 267 of the fastening element 260 after it is pushed into the fastened position within the receiver. The receiver 256 is shaped and dimensioned to conform to the shape and dimensions of the fastening element 260 thereby creating a bias F3, F3' against the fastening element in the direction in which it is pushed into place. In this way, the bias F4 provided by the interaction of the retainer 275 and shoulder portion 264 of the fastening element 260 is such that the retainer securely holds and maintains the fastening element 260 in place whilst the fastening element 260 at the same time creates a bias F2 against the elongated wall portions 241 to secure them within the bracket 202 at the channel 252. Together the forces including forces F1, F1', F2, F3, F3' and F4 and the interactions of the three components (first base mounting plate, second support plate and the fastening element) provides for a secure connection of the support plate and the base mounting plate. The torque and forces arising from the torque have been discussed above, these forces and in particular active at securing and tightening the coupling between the bracket and connector.

As fastening element 260 is inserted into receiver 256, forces are applied by the fastening element 260 to the connector wall 240 such that the connector wall 241 is displaced from a first rest position, when there is no interaction between the fastener and receiver, to a second fastened position when the fastening element 260 is located in the receiver 256.

Referring to FIGS. 5A, 5B, 5C and 5D, further exemplary fastening elements are described. The fastening elements have features in common with fastening element 260 and the same reference numbers are used where appropriate.

As described above, the fastening elements of the various arrangements are an integral component of the mounting systems 200 of the specification. The form of the fastening elements including shape and dimensions conforms to that of a corresponding receiver 256. The fastening element is configured as an expansion element. The fastening elements and corresponding receivers each comprise corresponding mating features. The fastening elements and corresponding receivers are configured to provide controlled forces therebetween and for coupling the base mounting plate and the device support plate. It will be appreciated that fastening elements and corresponding receivers of alternative suitable form to that described above with reference to FIGS. 2 to 4 may be provided.

Figures 5A, 5B:
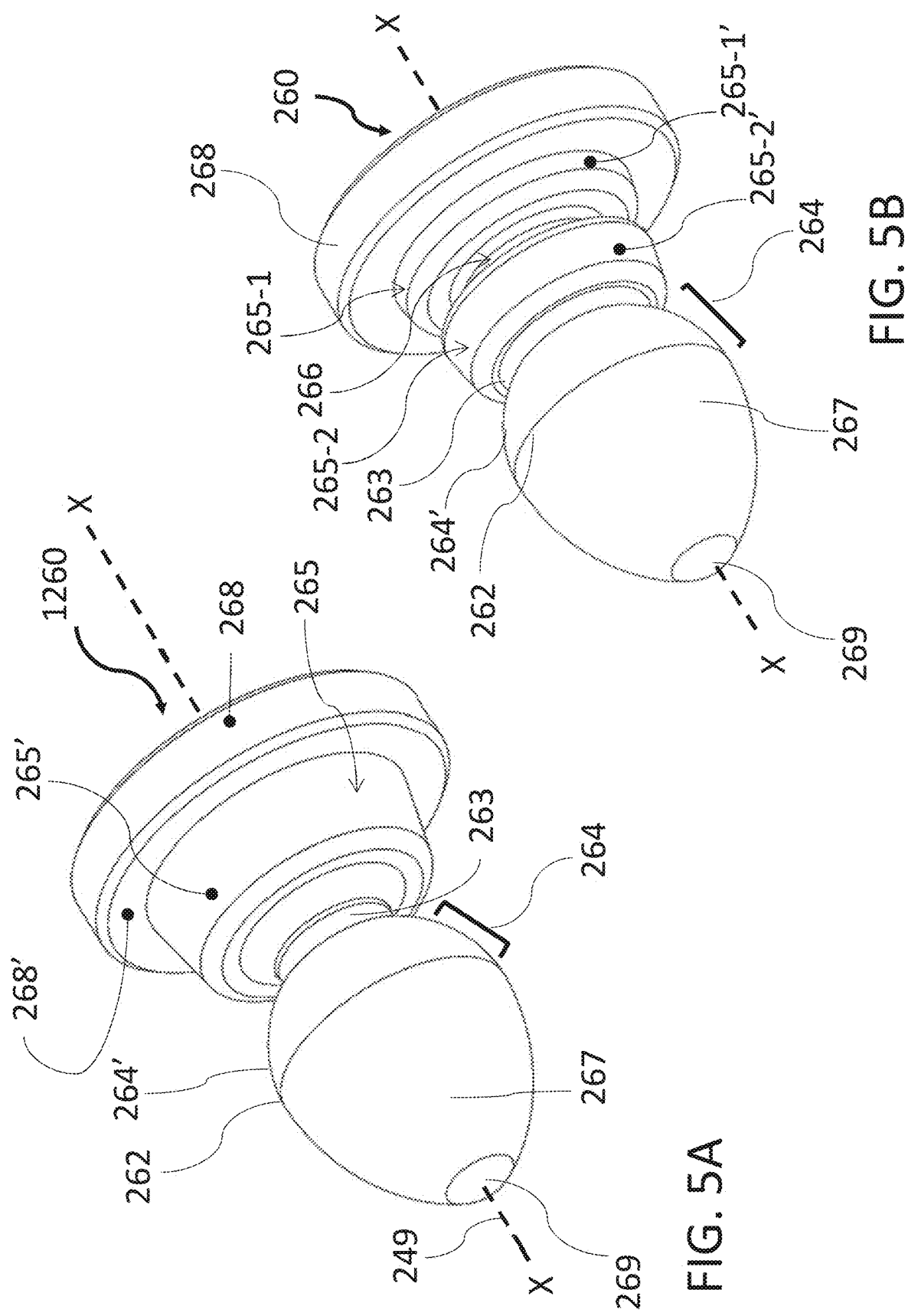
FIGS. 5A, 5B, 5C and 5D provide perspective views of alternative fastening element according to arrangements of the specification.

FIG. 5B provides a close-up perspective view of the fastening element 260.

Referring to FIG. 5A a fastening element 1260 is described. The fastening element 1260 comprises an elongated body 261 that extends from a head portion 268 at a proximal end to a tip 269 at a distal end. The fastening element comprises an engagement member 264 and contact members 265 which are arranged axially about a central longitudinal axis 249. An external peripheral wall of the engagement and contact members defines a mating surface for engagement with corresponding portions of the internal peripheral surface 255 of the receiver 256.

The first engagement member 264 is configured to interlock with a retainer of a corresponding receiver to engage the fastening element with the receiver. The first engagement member 264 comprises a body 267 of a generally ovoid form and extends between a neck portion 263 near the base end of the ovoid to a distal end 269 at the tip end. A curved shoulder portion 264' of the external peripheral surface of the body 267 extends outwardly relative to the axis between the neck 263 and widest portion 262 of the ovoid body 267. The external peripheral surface at the curved shoulder portion 264' defines a mating surface which in use is configured to contact and engage with a retainer 275 of the receiver 256.

The fastening element 1260 further comprises an annular contact member 265 separated from the main body 267 by a recessed channel at the neck 263. The external peripheral walls 265' define a mating surface configured for engaging with corresponding portions of the inner peripheral wall 255 of the receiver 256, when located in the fastened position. The external peripheral wall 265' is also active in providing expansion. This provides a bending of the proximal end of the connector walls 241 where there is mating between the surface 265' and the surface 272' of the receiver. The external peripheral wall 265' tapers inwardly (radially) in the direction from the proximal end to the distal end of the fastening element, reflecting the form of the receiver. A radial step 268' is provided between the head 268 and first contact member 265. In use, in the arrangements of the drawings the head portion 268 remains outside the receiver 256 when the fastening element is engaged. The dimensions and features of the fastening element are selected taking account of the form, dimensions and features of the corresponding receiver 256 of connector 206.

The fastening element 1260 and receiver 256 are configured to provide a controlled application of forces therebetween on their interaction. As a fastening element 1260 is inserted into the receiver 256 the forces arising from the interaction include forces in directions generally radially outward and orthogonal to the central axes of the receiver and fastening element, and bracket of the base mounting plate and forces in the axial directions.

Figures 5C, 5D:
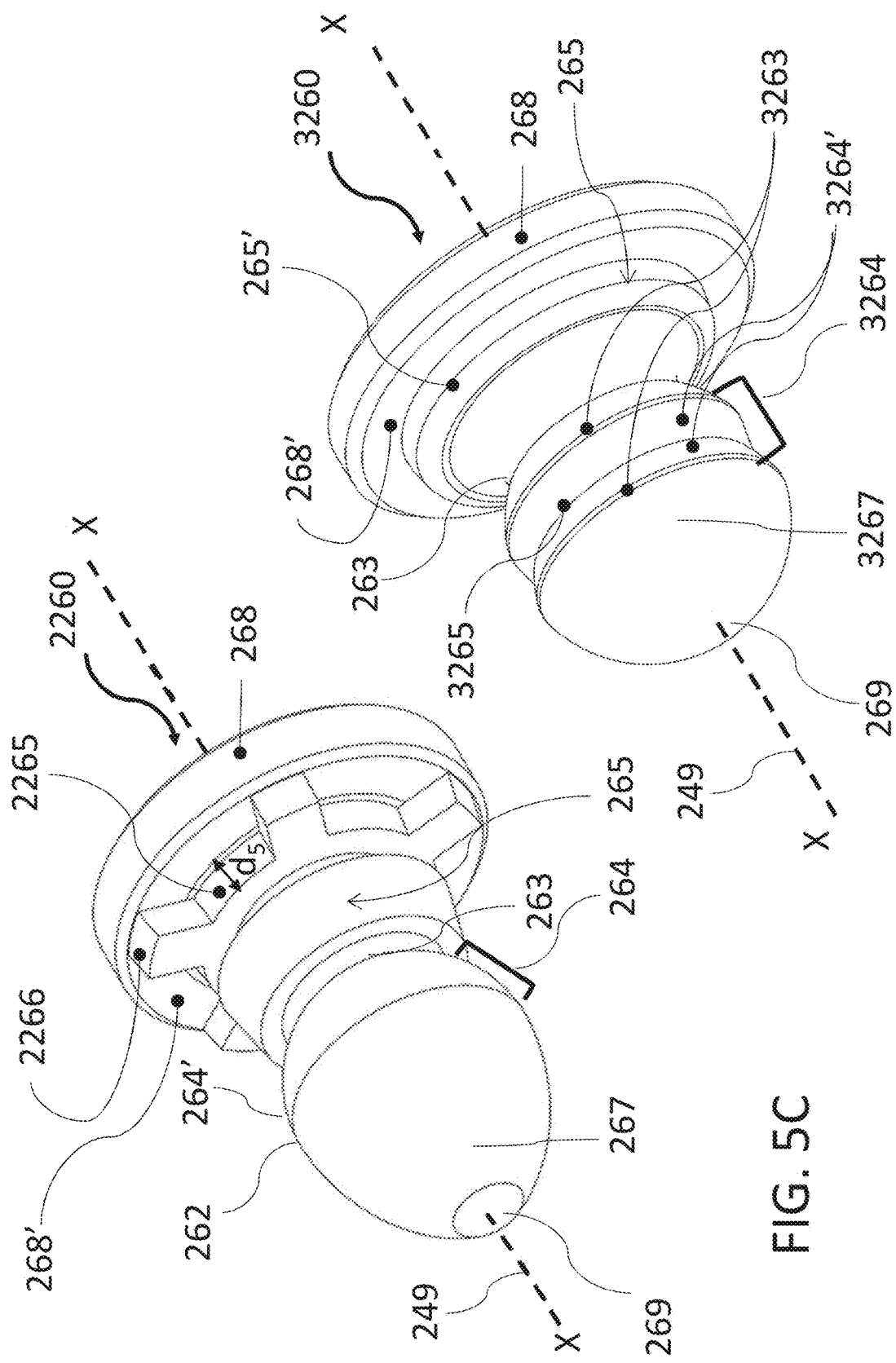
Figure 6:
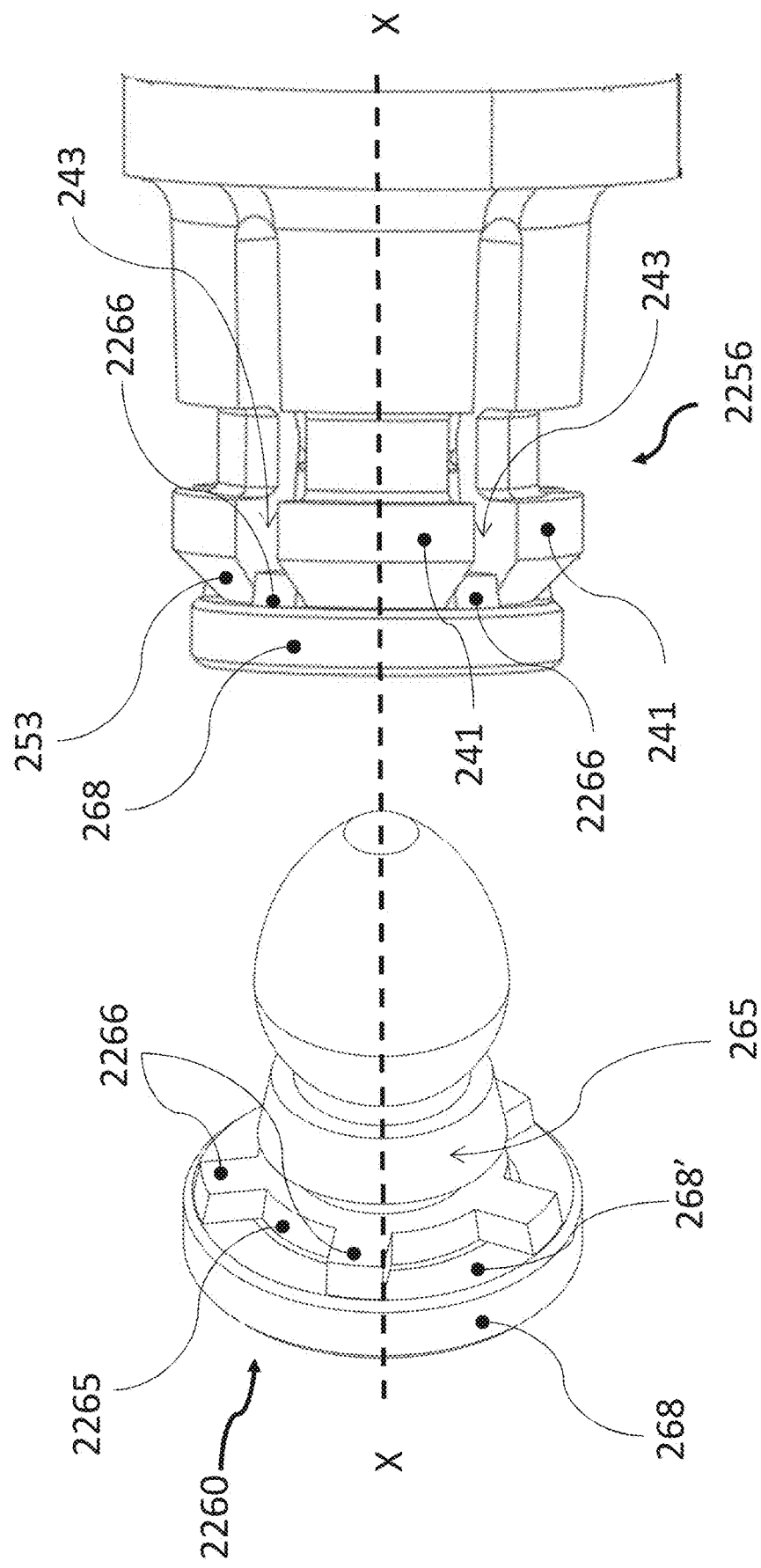
FIG. 6 is a cross-sectional side view of an alternative tightening pin or fastening element (also shown in FIG. 5C) before and after is has been received within a recess of the flexible connector according to arrangements of the present specification.

The fastening element 2260 of FIG. 5C and FIG. 6 is similar to that of FIG. 5A. However, an additional contact member 2265 is provided between the first contact member 265 and the head 268. A step 268' is provided between the peripheral edge surface of the head portion 268 and the contact member 2265. The contact member 2265 comprises a plurality of locking members 2266. The contact member 2265 is of annular form of depth d5, the locking members 2266 extend radially outwardly from contact member 2265 between the peripheral wall thereof and that of the head portion 268. The locking members 2266 are spaced apart.

The locking member 2266 are arranged similarly to spokes relative to the contact member 2265 and of depth d5. The locking members 2266 are configured for interlocking with end members 253 (FIGS. 3A, 4A and 7) of a corresponding connector. When the fastening element 2260 and connector are engaged the locking members 2266 are located between the end members 253 in the slots 243 of the connector wall 241.

Referring to FIG. 5D, a further fastening element 3260 according to an exemplary arrangement of the specification is described. The overall form and configuration of the fastening element is similar to those of FIGS. 5A to 5C. The fastening element 3260 further comprises a main body portion 3267 of a generally spherical form. The main body portion 3267 comprises a recess 3264 defining an engagement member. The recess 3264 comprises a V-shaped trough formed recessed into the body portion 3267 near the circumference thereof. The V-shaped trough extends circumferentially around the main body portion 3267. The recess 3264 comprises an inner base 3265, and walls 3264' that taper outwardly from the base 3265 to outer ends 3263 defining the V-shaped form.

The fastening element 3260 further comprises an annular contact member 265 separated from the main body 3267 by a recessed channel at the neck 263. The external peripheral walls 265' define a mating surface configured for engaging with corresponding portions of the inner peripheral wall 255 of the receiver 256, when located in the fastened position. The external peripheral wall 265' tapers inwardly (radially) in the direction from the proximal end to the distal end 269 of the fastening element 3260, reflecting the form of the receiver. A radial step 268' is provided between the head 268 and first contact member 265. In use, in the arrangements of the drawings the head portion 268 remains outside the receiver 256 when the fastening element is engaged. The dimensions and features of the fastening element are selected taking account of the form, dimensions and features of the corresponding receiver 256 of connector 206.

The forces arising from the interaction of the fastening element 3260 and the receiver 256 are illustrated. As described above with reference to FIGS. 4A to 4F, the forces include forces in the axial direction F3, F4, forces in generally outward or radial directions F1, F2', torque F5 and forces generated by torque F6.

With reference to FIGS. 7A and 7B, the fastening element 3260 of FIG. 5D is shown located in a corresponding receiver 256 of a connector. The receiver is configured to comprise a retainer 3275 that conforms to the form of the recess 3264.

Figure 8A:
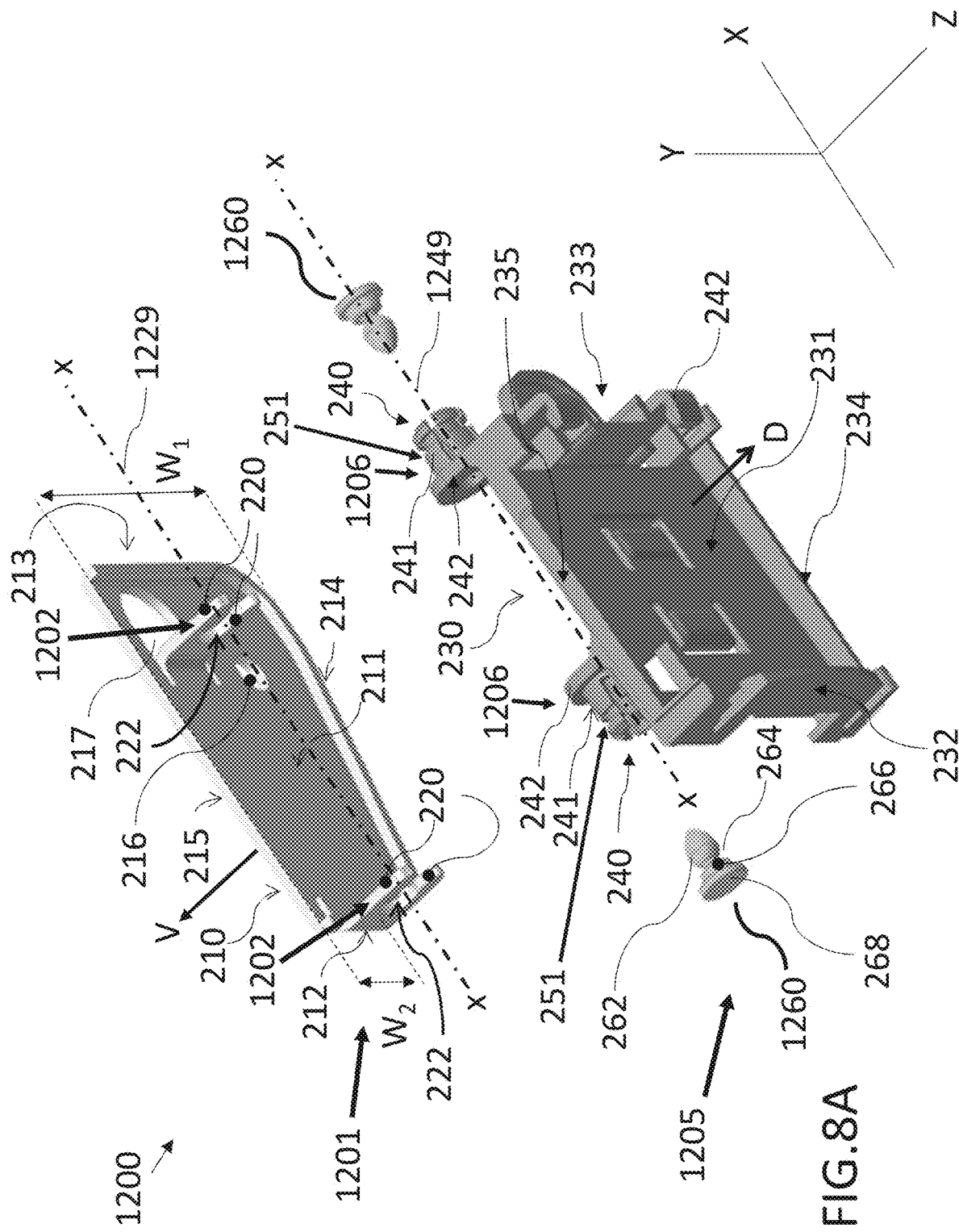
FIGS. 8A and 8B show perspective views of an alternative mounting system according to arrangements of the specification.

Referring to FIG. 8A an alternative mounting system 1200 is described. The mounting system 1200 is similar to the mounting system of FIG. 2 and the same reference numbers have been used where appropriate. The mounting system 1200 comprises a base mounting plate 1201 and a device support plate 1205. The base mounting plate 1201 comprises brackets 1202 for coupling with connectors 1206 of the device support plate 1205. The connectors 1206 of the device support plate 1205 have some flexibility and resilience. The base mounting plate 1201 and the bracket 1202 is relatively more rigid than the connector 1206 of the device support plate 1205. The device support plate and connectors may be comprised of a plastics material. The base mounting plate may be of a metal material. However, it will be appreciated that any suitable materials having the required properties of rigidity or flexibility may be used.

Figure 8B:
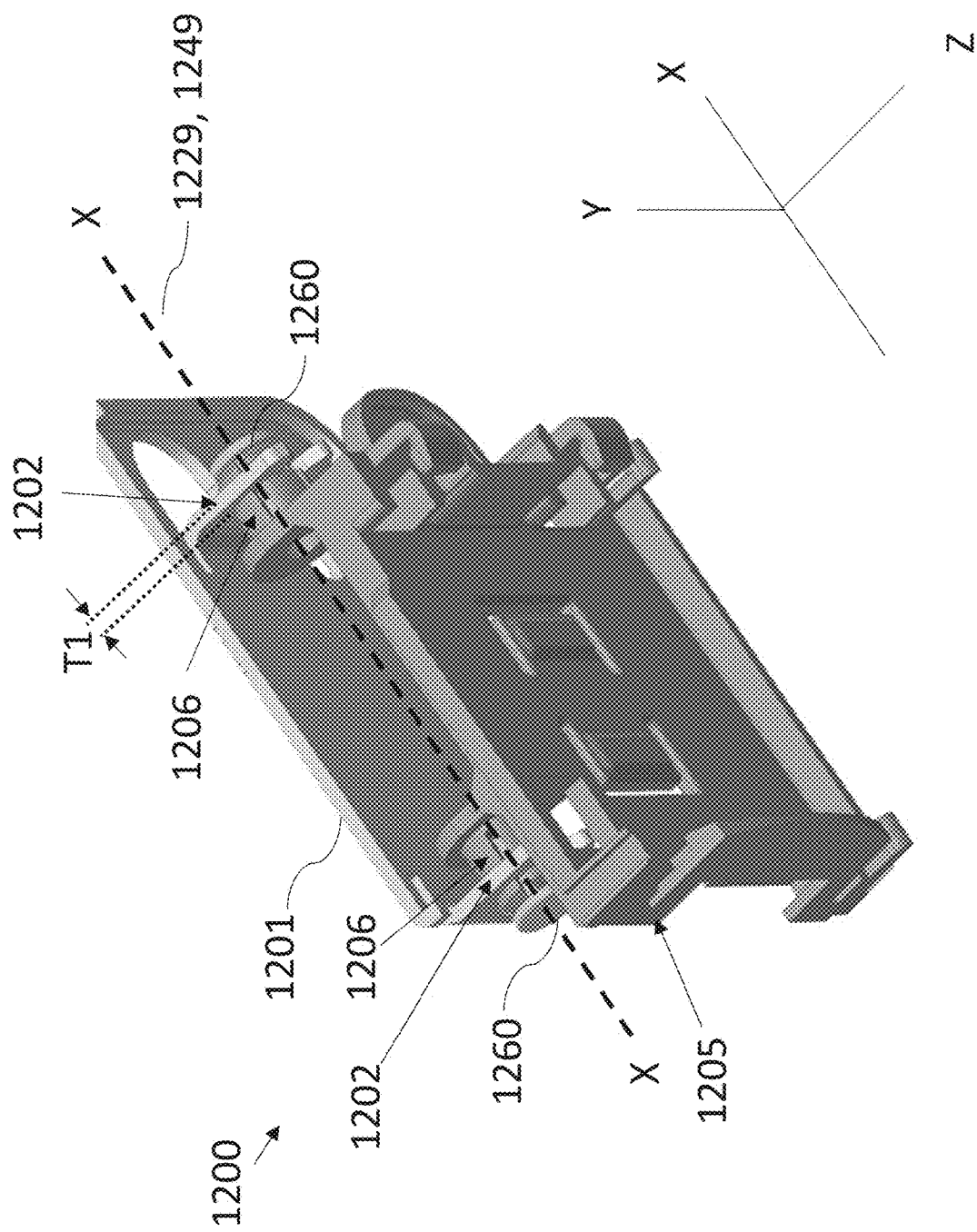

When coupled, as illustrated in FIG. 8B, the plates 1201, 1205 are arranged longitudinally offset and spaced apart in the lateral direction. The plates 1201, 1205 contact each other at the connectors 1206 and brackets 1202. The coupling is located between the plates. The central longitudinal axes 1229, 1249 through the brackets 1202 and connectors 1206 are aligned when the plates are coupled. Fastening element 1260 (as described with reference to FIG. 5B are provided for securing the plates together in the coupled position. When engagement the fastening elements, connectors and brackets are all concentrically arranged about the central longitudinal axis of the couplings. The connection between the fastening element and receiver of the connector is in the axial or longitudinal direction. The connection between the connector and brackets in a direction orthogonal to the axial direction.

In the arrangement of FIGS. 8B, in contrast to the mounting system of FIGS. 2, the fastening elements 1260 are inserted into the receivers of the connectors 1206 in opposing directions. The first and second connectors 1206 are oriented axially aligned but in opposing directions. This arrangement can be advantageous in applications where access or clearly space at the connectors is limited, as the fastening elements may be inserted into the respective receivers from a position external to the plates and couplings.

The description of the mounting system 200 described with reference to FIG. 2 applies to the mounting system 1200 of FIG. 8.

Figure 8C:
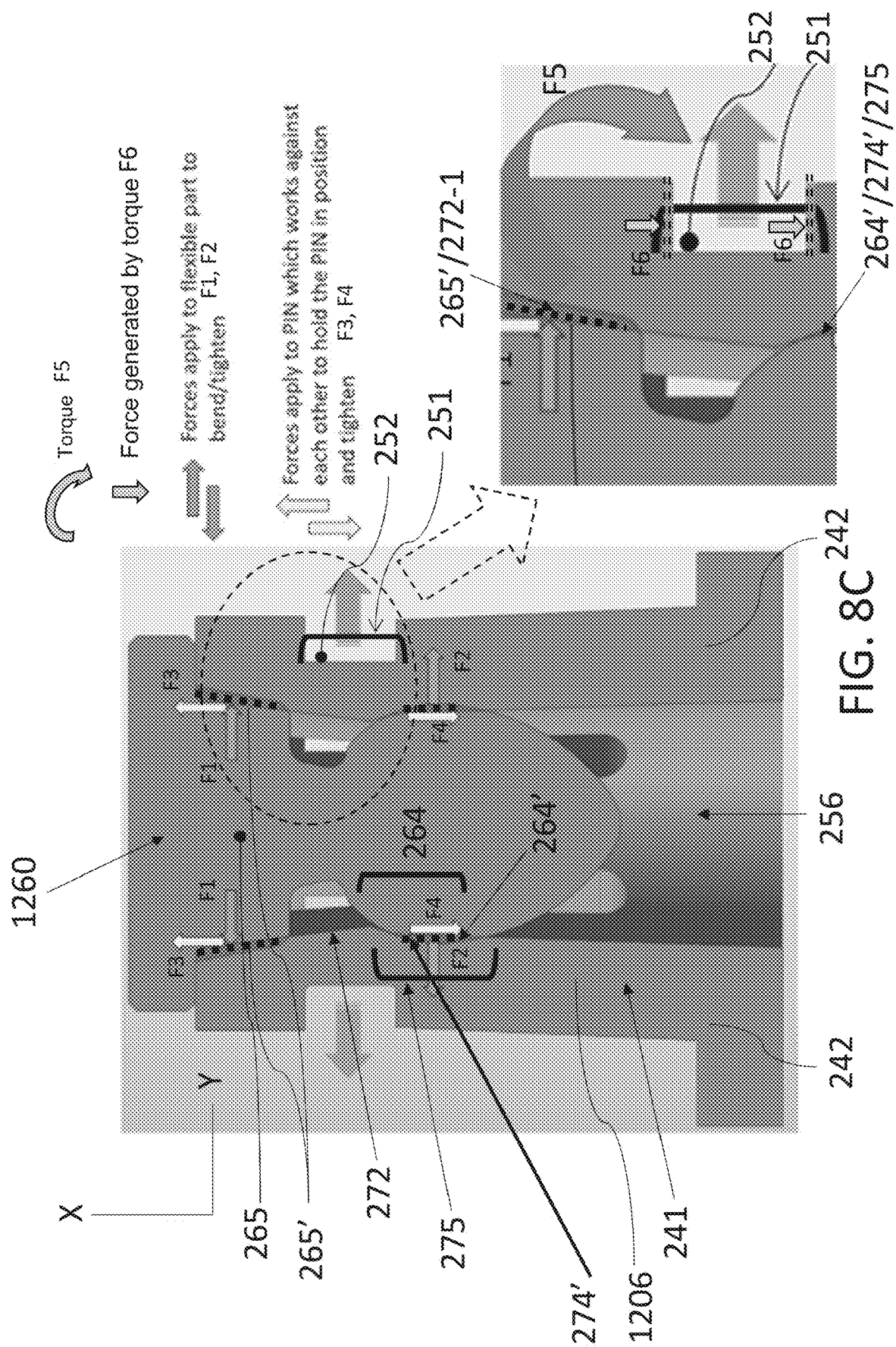
FIG. 8c shows a close-up cross-sectional view of the coupling of the fastening element in a connector according to the arrangements of FIG. 8.

Referring to FIG. 8c, some exemplary forces provided by the interaction of the fastening element 1260 with connector 1206 are illustrated. The arrangement and the forces arising are similar to those described with reference to FIG. 4D. The exemplary forces include forces that are directed generally outwardly and act to provide a flexing of the connector wall 241. These forces include forces directly outwardly or radially F1 and F2' which as shown act proximally of and adjacent to the bracket connector member 251 and channel 252. These radially directed and outwardly directed forces are directed at the connector wall 241 circumferentially and provide a displacement or flexing of the connector wall outwardly relative to the central longitudinal axis which provides for a tightening of the coupling of the bracket in the channel 252. The tightening, as described previously with reference to FIG. 4F, applies also to the arrangement of FIG. 8c.

The tightening of the coupling is between all three surfaces of the channel 252, and the corresponding three mating surfaces of the bracket, namely the internal peripheral surface 223, and the side walls of the arms adjacent to the internal peripheral surface. As described the channel 252 has a U-shaped form. The enlarged view of the bracket, as provided in FIG. 8c, shows that the forces include the force F5 which acts to provide bending of the connector wall in the direction of the channel 252. The connector has flexibility and resilience and flexes at the channel to tightly engage with the bracket located in the channel. All three wall of the channel are pressed against the corresponding portion of the bracket. Force F5 is torque. Additional forces F6 are provided to effectively clamp the channel and the bracket. Forces F6 are generated by torque.

The forces which drive the tightening of the coupling at the channel and the bracket include those arising from the interaction of the fastening element with the receiver at the mating surface 265' of the first contact member 265 and corresponding portion 272-1 of the guide portion 272. The forces between the engagement member 264 and the retainer 275 are also active. The interaction includes between the external peripheral surface 264' of the engagement member and the internal peripheral surface 274' at the retainer.

The exemplary forces also include forces (F3 and F4) in axially opposing directions which work together to maintain the fastening element in the receiver. The tapered external peripheral walls 265' which define contact surfaces of contact members 265 when pushed into place and coupled to the receiver 256 creates a bias F3 in the opposite direction to which it is pushed into the channel when in place. This bias F3 created by the contact member 265 against the receiver opposes the bias F4 arising from the interaction between the fastening element at the shoulder portion 264 and the retainer 275. These biasing forces F3 and F4 work together and simultaneously such that the fastening element 1260 is thereby held securely in place in the receiver 256. The wall 241 of the connector 1206 is effectively clamped between the relatively rigid fastening element 1260 and the bracket 1202.

As described with reference to the arrangements of FIG. 2, the plates 1201 and 1205 are coupled about a common axis 1229, 1249 (X direction in the drawings). The couplings are circumferential, and the arrangement provides that the plates may be rotated relative to one another about the couplings. Therefore, when the mounting system is mounted and fixed in a vehicle, it remains possible to adjust the tilt of one plate relative to the other about the axis. This allows for adjustment of the electronic device or module supported thereon.

Figure 9:
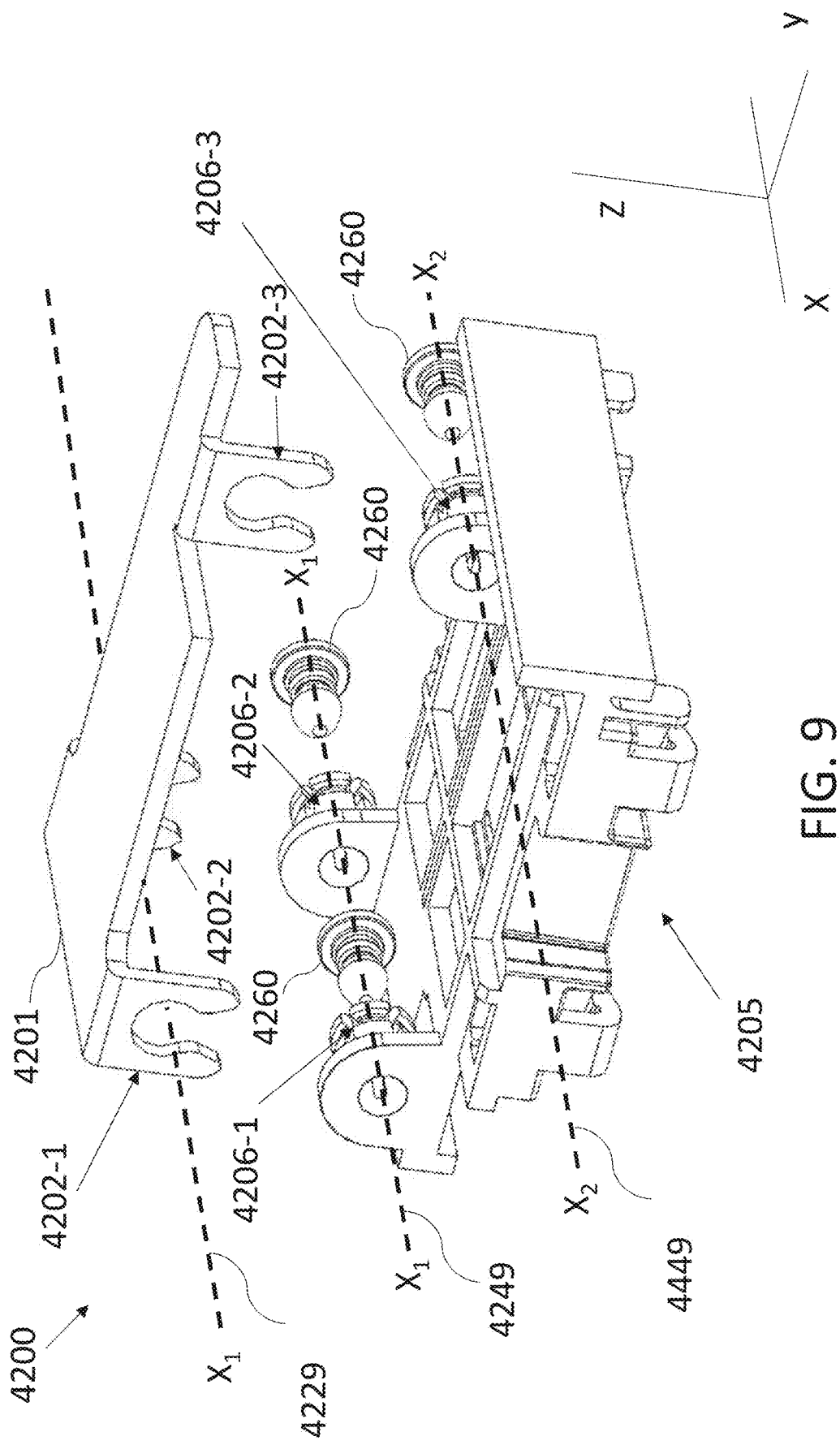
FIG. 9 shows an alternative mounting system according to an exemplary arrangement of the specification, in this case three connector and bracket pairs are provided for coupling of the plates, two pairs are aligned about a common axis, the third pair is not in alignment with either of the other two pairs.

Referring to FIG. 9, a mounting system 4200 according to a further exemplary arrangement of the specification is described. Mounting system 4200 comprises a base mount plate 4201 having brackets 4202. The device support plate 4205 comprises connectors 4206 for coupling to corresponding brackets 4202. Three connector 4206 and corresponding bracket 4202 pairs are provided. Two of the connector 4206-1, 4206-2 and bracket 4202-1, 4202-2 pairs, are arranged such that the axis 4249 through the connectors is aligned with the axis 4229 through the brackets when coupled (direction X1 in the drawings). The third connector and bracket pair 4206-3, 4202-3, is arranged such that this third coupling is non-aligned with the first two connector and bracket pairs. If the plates 4201 and 4205 are connected at the aligned bracket and connector pairs it is possible as described with reference to FIG. 2 to change the tilt of one plate relative to the other by rotating or tilting one or other about the axis of the couplings. If the plates are connected at non-aligned bracket and connectors, then the plates are coupled in a static arrangement, tilting is not possible.

The arrangements of the specification provide improved mounting systems according to the various exemplary arrangement shown, for mounting an electronic device or electronic module to a vehicle. The arrangements of the specification advantageously address issues associated with previous systems. The flexible connector is configured for snap fitting to the more rigid mounting plate at the bracket. Due to tolerances there will be some clearance or gap between rigid and flexible part. To eliminate this gap and make the snap fitting joint robust and stiff against load, stress, and noise or rattling due to tolerances, the fastening element is provided. The fastening element is configured to be assembled to the first and second plates in a direction perpendicular or orthogonal to the snap fitting direction.

The arrangement includes the special interacting features of the first and second plates and the fastening element and advantageously provides a secure and robust connection, which addresses problems associated with prior arrangements. The couplings are circumferential and configured to allow rotation around the coupling axis to allow positioning or repositioning of the electronic device. The support plate and fastening element may be manufactured of a plastics material and may be manufactured using the same system.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. The use of "exemplary" means "an example of" and is not intended to convey a meaning of an ideal or preferred embodiment.

What is claimed is:

1. A system comprising:
   a device support plate for supporting an electronic device;
   a base mounting plate; and
   a fastening element for securing the device support plate to the base mounting plate,
   the device support plate further comprising a connector defined by a wall arranged about a central longitudinal axis, the wall comprising a plurality of resilient wall portions, and an internal peripheral surface of the wall comprising a channel extending axially therethrough defining a receiver for receiving the fastening element,
   the fastening element further comprising an engagement member comprising an external peripheral surface defining a mating surface for contacting a corresponding mating surface of the receiver, and
   the engagement member configured to apply a respective controlling force to a corresponding mating surface of the receiver, the controlling force causing the plurality of the resilient wall portions of the receiver to be displaced, such that the wall of the connector engages with a corresponding bracket of the base mounting plate, so as to fasten the base mounting plate to the device support plate.

2. The system of claim 1, wherein the base mounting plate comprises:
   at least one bracket for coupling to the device support plate.

3. The system of claim 2, wherein a corresponding connector of the device support plate comprises:
   a bracket connector member for coupling to the base mounting plate at the bracket.

4. The system of claim 3, wherein the bracket connector member comprises:
   a circumferential channel formed recessed relative to an external peripheral surface of the wall of the connector.

5. The system of claim 4, wherein the bracket and the bracket connector member are formed and dimensioned such that a portion of the bracket is receivable in the circumferential channel when the connector in snap-fitted into the bracket.

6. The system of claim 3, wherein:
the connector and bracket are configured for coupling in a direction orthogonal to the central longitudinal axis of the connector, and
the fastening element and connector are configured for coupling in a direction of the central longitudinal axis.

7. The system of claim 6, wherein when engaged the fastening element and connector, and the bracket and bracket connector member are arranged concentrically around the central longitudinal axis of the connector.

8. The system of claim 3, wherein the bracket connector member and the channel are located adjacent to and externally of a retainer of the receiver, the bracket connector member and the channel are formed in the external peripheral surface of the connector, and the retainer is formed in the internal peripheral surface.

9. The system of claim 1, wherein the plurality of resilient wall portions are spaced apart by slots, the resilient wall portions and slots extending in a direction of the central longitudinal axis.

10. The system of claim 1, wherein the resilient wall portion of the connector is displaced outwardly relative to a central longitudinal axis of the receiver.

11. The system of claim 1, wherein each fastening element and corresponding receiver comprises conforming mating features for controlling forces therebetween when engaged, the forces resulting from an interaction of the fastening element and the receiver including forces in opposing axial directions which act to maintain the fastening element in the receiver.

12. The system of claim 1, wherein the forces resulting from an interaction of the fastening element and the receiver include forces that are provided in directions generally radial to the central longitudinal axis, and that act to provide displacement of the connector wall outwardly with respect to the central longitudinal axis, and to thereby provide an interlocking of the base mounting plate at the device support plate, at the connector and the bracket.

13. The system of claim 1, wherein the fastening element comprises:
an elongated body that extends from a head portion at a proximal end to a tip at a distal end.

14. The system of claim 13, wherein the engagement member further comprises:
a first engagement portion having a body of generally spherical or ovoid form, wherein the mating surface thereof is configured to be engaged in a retainer of the receiver; and
a second engagement portion having a body of generally cylindrical form,
wherein the first and second engagement members are in use circumferentially engaged with the receiver at axially spaced apart locations.

15. The system of claim 14, wherein the retainer comprises:
a circumferential ridge that projects into the receiver relative to an internal peripheral wall of the receiver; and
a recess provided adjacent to the circumferential ridge,
wherein a form of the retainer conforms with a corresponding form of the first and second engagement portions, respectively, of the fastening element.

16. The system of claim 1, wherein the receiver comprises:
a guide portion and a retainer each configured to engage corresponding engagement portions of the fastening element.

17. The system of claim 16, wherein the guide portion comprises:
a tapered guide portion that extends between an opening and the retainer.

18. The system of claim 1, wherein the fastening element and connector are configured such that radial forces resulting from an interaction of engagement portions of the fastening element and corresponding portions of an internal peripheral wall of the receiver are applied to the wall of the connector at axial locations either side of the channel to thereby provide for a tightening of connections between the bracket and the channel.

19. The system of claim 1, wherein, when coupled, the device support plate and the base mounting plate are configured to contact only at the brackets and connectors.

20. The system of claim 1, wherein the connector is a first connector, the fastening element is a first fastening element, and the bracket is a first bracket, the system further comprising:
a second connector, a second fastening element, and a second bracket, the first and second connectors being configured for coupling with corresponding first and second brackets of the base mounting plate by first and second fastening elements, respectively, in first and second connector and bracket pairs, and
wherein the first and second connector and bracket pairs, when coupled, are arranged in alignment about a common axis, and are configured to allow rotation of one of the device support plate or the base mounting plate about the common axis and when fastened with the at least one fastening element.

* * * * *